United States Patent
Claus et al.

(10) Patent No.: US 11,010,834 B2
(45) Date of Patent: *May 18, 2021

(54) SYSTEM AND METHOD FOR OPTIMIZING EXECUTION OF TRADING ORDERS

(71) Applicant: BGC PARTNERS, INC., New York, NY (US)

(72) Inventors: Matthew W. Claus, Summit, NJ (US); James R. Driscoll, New York, NY (US); James C. Johnson, Cresskill, NJ (US)

(73) Assignee: BGC PARTNERS, INC., New York, NY (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/133,099

(22) Filed: Sep. 17, 2018

(65) Prior Publication Data

US 2019/0066209 A1 Feb. 28, 2019

Related U.S. Application Data

(63) Continuation of application No. 13/180,010, filed on Jul. 11, 2011, now abandoned, which is a (Continued)

(51) Int. Cl.
*G07F 17/32* (2006.01)
*G06Q 40/04* (2012.01)
(Continued)

(52) U.S. Cl.
CPC ............. *G06Q 40/04* (2013.01); *G06Q 20/10* (2013.01); *G06Q 20/40* (2013.01);
(Continued)

(58) Field of Classification Search
CPC ........ G06Q 40/04; G06Q 40/00; G06Q 40/06; G06Q 20/10; G06Q 20/40
(Continued)

(56) References Cited

U.S. PATENT DOCUMENTS 3,573,747 A 4/1971 Adams et al.
3,581,072 A 5/1971 Nymeyer
(Continued)

FOREIGN PATENT DOCUMENTS

AU 2008/200781 3/2008
EP 0388162 3/1990
(Continued)

OTHER PUBLICATIONS

U.S. Appl. No. 12/945,046, filed Nov. 2010, Daley et al.
(Continued)

*Primary Examiner* — Hai Tran

(57) ABSTRACT

A system for processing trading orders comprises an optimizer module operable to receive a first trading order and a second trading order. The optimizer module is further operable to receive market data associated with at least one market center. The optimizer module is further operable to determine whether to transmit the second trading order to the at least one market center prior to transmitting the first trading order to the at least one market center, the determination based at least in part on the market data.

39 Claims, 4 Drawing Sheets

Related U.S. Application Data continuation of application No. 11/398,241, filed on Apr. 4, 2006, now Pat. No. 7,979,339.

(51) Int. Cl.
*G06Q 20/10* (2012.01)
*G06Q 20/40* (2012.01)
*G06Q 40/00* (2012.01)
*G06Q 40/06* (2012.01)
*G06Q 30/02* (2012.01)

(52) U.S. Cl.
CPC ......... *G06Q 30/0283* (2013.01); *G06Q 40/00* (2013.01); *G06Q 40/06* (2013.01)

(58) Field of Classification Search
USPC .......................................................... 705/37
See application file for complete search history.

(56) References Cited

U.S. PATENT DOCUMENTS

| | | |
|---|---|---|
| 4,412,287 A | 10/1983 | Braddock, III |
| 4,674,044 A | 6/1987 | Kalmus et al. |
| 5,077,665 A | 12/1991 | Silverman et al. |
| 5,101,353 A | 3/1992 | Lupien et al. |
| 5,136,501 A | 8/1992 | Silverman et al. |
| 5,297,031 A | 3/1994 | Gutterman et al. |
| 5,305,200 A | 4/1994 | Hartheimer et al. |
| 5,375,055 A | 12/1994 | Togher et al. |
| 5,717,989 A | 2/1998 | Tozzoli et al. |
| 5,727,165 A | 3/1998 | Ordish et al. |
| 5,787,402 A | 7/1998 | Potter et al. |
| 5,794,207 A | 8/1998 | Walker et al. |
| 5,873,071 A | 2/1999 | Ferstenberg et al. |
| 5,915,245 A | 6/1999 | Patterson, Jr. et al. |
| 5,924,083 A * | 7/1999 | Silverman ............... G06Q 40/04 705/37 |
| 5,930,762 A | 7/1999 | Masch |
| 5,950,177 A | 9/1999 | Lupien et al. |
| 5,970,479 A | 10/1999 | Shepherd |
| 6,012,046 A | 1/2000 | Lupien et al. |
| 6,014,643 A | 1/2000 | Minton |
| 6,029,146 A | 2/2000 | Hawkins et al. |
| 6,058,379 A | 5/2000 | Odom et al. |
| 6,098,051 A | 8/2000 | Lupien et al. |
| 6,112,181 A | 8/2000 | Shear |
| 6,141,653 A | 10/2000 | Conklin et al. |
| 6,173,270 B1 | 1/2001 | Cristofich et al. |
| 6,236,972 B1 | 5/2001 | Shkedy |
| 6,247,000 B1 | 6/2001 | Hawkins et al. |
| 6,278,982 B1 | 8/2001 | Korhammmer et al. |
| 6,285,989 B1 | 9/2001 | Shoham |
| 6,393,409 B2 | 5/2002 | Young et al. |
| 6,405,180 B2 | 6/2002 | Tilfors et al. |
| 6,408,282 B1 | 6/2002 | Buist |
| 6,418,419 B1 | 7/2002 | Nieboer et al. |
| 6,421,653 B1 * | 7/2002 | May ....................... G06Q 30/08 705/36 R |
| 6,505,175 B1 | 1/2003 | Silverman et al. |
| 6,519,571 B1 | 2/2003 | Guheen |
| 6,532,460 B1 | 3/2003 | Amanat et al. |
| 6,536,935 B2 | 3/2003 | Parunak et al. |
| 6,601,044 B1 | 7/2003 | Wallman |
| 6,606,744 B1 | 8/2003 | Mikurak |
| 6,615,188 B1 | 9/2003 | Breen et al. |
| 6,618,707 B1 | 9/2003 | Gary |
| 6,625,583 B1 | 9/2003 | Silverman et al. |
| 6,629,082 B1 | 9/2003 | Hambrecht et al. |
| 6,731,729 B2 | 5/2004 | Eng et al. |
| 6,772,132 B1 | 8/2004 | Kemp, II et al. |
| 6,829,589 B1 | 12/2004 | Saliba |
| 6,847,934 B1 | 1/2005 | Lin et al. |
| 6,871,191 B1 | 3/2005 | Kinney, Jr. et al. |
| 6,909,941 B2 | 6/2005 | Scott et al. |
| 6,938,011 B1 | 8/2005 | Kemp, II et al. |
| 6,963,856 B2 | 11/2005 | Lutnick et al. |
| 6,983,011 B1 | 1/2006 | Hara et al. |
| 6,983,260 B2 | 1/2006 | Hummelgren |
| 7,035,819 B1 | 4/2006 | Gianakouros et al. |
| 7,035,820 B2 | 4/2006 | Goodwin et al. |
| 7,058,602 B1 | 6/2006 | La Mura et al. |
| 7,110,969 B1 | 9/2006 | Bennett et al. |
| 7,110,975 B2 | 9/2006 | Marks de Chabris et al. |
| 7,113,924 B2 | 9/2006 | Fishbain |
| 7,127,424 B2 | 10/2006 | Kemp, II et al. |
| 7,152,037 B2 | 12/2006 | Smith |
| 7,162,447 B1 | 1/2007 | Cushing |
| 7,181,419 B1 | 2/2007 | Mesaros |
| 7,197,483 B2 | 3/2007 | Brady et al. |
| 7,209,896 B1 | 4/2007 | Serkin et al. |
| 7,213,000 B2 | 5/2007 | Gutierrez et al. |
| 7,231,363 B1 | 6/2007 | Hughes et al. |
| 7,242,669 B2 | 7/2007 | Bundy et al. |
| 7,246,092 B1 | 7/2007 | Peterson et al. |
| 7,277,868 B2 | 10/2007 | Terashima |
| 7,310,620 B2 | 12/2007 | Moore et al. |
| 7,330,834 B1 | 2/2008 | LaPierre |
| 7,383,220 B1 | 6/2008 | Keith |
| 7,386,497 B1 | 6/2008 | Gooch |
| 7,392,214 B1 | 6/2008 | Fraser et al. |
| 7,401,044 B1 | 7/2008 | Fraser et al. |
| 7,483,850 B1 | 1/2009 | Fishbain |
| 7,536,338 B2 | 5/2009 | Guler et al. |
| 7,571,132 B2 | 8/2009 | Cole |
| 7,574,395 B2 | 8/2009 | Sweeting |
| 7,587,346 B2 | 9/2009 | Malitzis |
| 7,653,584 B2 | 1/2010 | Schmitz et al. |
| 7,693,775 B2 | 4/2010 | Korhammer |
| 7,769,652 B1 | 8/2010 | Monroe |
| 7,818,191 B2 | 10/2010 | Lutnick |
| 7,835,987 B2 | 11/2010 | Daley et al. |
| 7,840,477 B2 | 11/2010 | Claus et al. |
| 7,979,339 B2 | 7/2011 | Claus et al. |
| 8,407,116 B1 | 3/2013 | Serkin |
| 8,463,649 B2 | 6/2013 | Lutnick et al. |
| 8,484,122 B2 | 7/2013 | Claus et al. |
| 8,494,951 B2 | 7/2013 | Claus et al. |
| 8,566,213 B2 | 10/2013 | Sweeting |
| 8,583,540 B2 | 11/2013 | Claus |
| 8,599,213 B2 | 12/2013 | DiVerdi et al. |
| 8,666,858 B2 | 3/2014 | Kemp et al. |
| 8,738,498 B2 | 5/2014 | Daley et al. |
| 9,805,417 B2 | 10/2017 | Kemp, II et al. |
| 2001/0037284 A1 | 11/2001 | Finkelstein et al. |
| 2001/0042040 A1 * | 11/2001 | Keith .................... G06Q 40/00 705/37 |
| 2001/0049651 A1 | 12/2001 | Selleck |
| 2001/0051909 A1 | 12/2001 | Keith |
| 2001/0056396 A1 | 12/2001 | Goino |
| 2002/0010672 A1 | 1/2002 | Waelbroeck et al. |
| 2002/0016758 A1 | 2/2002 | Grigsby |
| 2002/0023037 A1 | 2/2002 | White, Jr. |
| 2002/0046127 A1 | 4/2002 | Reading et al. |
| 2002/0052822 A1 | 5/2002 | Terashima |
| 2002/0052827 A1 | 5/2002 | Waelbroeck et al. |
| 2002/0055901 A1 | 5/2002 | Gianakouros et al. |
| 2002/0073016 A1 | 6/2002 | Furbush et al. |
| 2002/0087451 A1 | 7/2002 | Rieger et al. |
| 2002/0091606 A1 | 7/2002 | Shapiro |
| 2002/0091617 A1 | 7/2002 | Keith |
| 2002/0099640 A1 | 7/2002 | Lange |
| 2002/0108141 A1 | 8/2002 | Kang et al. |
| 2002/0120546 A1 | 8/2002 | Zajac |
| 2002/0156719 A1 | 10/2002 | Finebaum et al. |
| 2002/0169703 A1 | 11/2002 | Lutnick et al. |
| 2002/0178104 A1 * | 11/2002 | Hausman ............... G06Q 40/04 705/37 |
| 2002/0188548 A1 | 12/2002 | Bunda |
| 2002/0198816 A1 | 12/2002 | Gilbert et al. |
| 2003/0004858 A1 | 1/2003 | Schmitz et al. |
| 2003/0009411 A1 | 1/2003 | Ram et al. |
| 2003/0009412 A1 | 1/2003 | Furbush et al. |
| 2003/0009413 A1 | 1/2003 | Furbush et al. |
| 2003/0014351 A1 | 1/2003 | Neff et al. |

(56) References Cited

U.S. PATENT DOCUMENTS

| | | |
|---|---|---|
| 2003/0093343 A1 | 5/2003 | Huttenlocher et al. |
| 2003/0097325 A1 | 5/2003 | Friesen et al. |
| 2003/0101128 A1 | 5/2003 | Abernethy |
| 2003/0101130 A1 | 5/2003 | Cliff |
| 2003/0126065 A1 | 7/2003 | Eng |
| 2003/0149636 A1 | 8/2003 | Lutnick et al. |
| 2003/0149661 A1 | 8/2003 | Mitchell et al. |
| 2003/0167224 A1 | 9/2003 | Periwal |
| 2003/0172024 A1 | 9/2003 | Kokis et al. |
| 2003/0177082 A1 | 9/2003 | Buckwalter |
| 2003/0177085 A1 | 9/2003 | Buckwalter et al. |
| 2003/0177086 A1 | 9/2003 | Gomber et al. |
| 2003/0216932 A1 | 11/2003 | Foley |
| 2003/0220867 A1 | 11/2003 | Goodwin et al. |
| 2003/0225646 A1 | 12/2003 | Failla et al. |
| 2003/0225674 A1 | 12/2003 | Hughes, Jr. et al. |
| 2003/0229557 A1 | 12/2003 | Richmann et al. |
| 2003/0229569 A1 | 12/2003 | Nalbandian et al. |
| 2003/0236729 A1 | 12/2003 | Epstein et al. |
| 2004/0019551 A1 | 1/2004 | Martyn et al. |
| 2004/0024684 A1 | 2/2004 | Montepeque |
| 2004/0034591 A1 | 2/2004 | Waelbroeck et al. |
| 2004/0059666 A1* | 3/2004 | Waelbroeck ............ G06Q 40/04 705/37 |
| 2004/0093296 A1 | 5/2004 | Phelan et al. |
| 2004/0103054 A1 | 5/2004 | Singer |
| 2004/0133526 A1* | 7/2004 | Shmueli ................. G06Q 30/06 705/80 |
| 2004/0143538 A1 | 7/2004 | Korhammer et al. |
| 2004/0143542 A1 | 7/2004 | Magill et al. |
| 2004/0172337 A1 | 9/2004 | Spoonhower et al. |
| 2004/0177024 A1 | 9/2004 | Bok et al. |
| 2004/0193496 A1 | 9/2004 | Hirota |
| 2004/0193596 A1 | 9/2004 | Defelice et al. |
| 2004/0210505 A1 | 10/2004 | Pourhamid |
| 2004/0210511 A1 | 10/2004 | Waelbroeck et al. |
| 2004/0210512 A1 | 10/2004 | Fraser et al. |
| 2004/0210514 A1 | 10/2004 | Kemp et al. |
| 2004/0215538 A1 | 10/2004 | Smith et al. |
| 2004/0236636 A1 | 11/2004 | Lutnick et al. |
| 2004/0236662 A1 | 11/2004 | Korhammer et al. |
| 2004/0254804 A1 | 12/2004 | Peterffy et al. |
| 2005/0015323 A1* | 1/2005 | Myr ........................ G06Q 40/04 705/37 |
| 2005/0017710 A1 | 1/2005 | Steinich et al. |
| 2005/0027635 A1 | 2/2005 | Monroe et al. |
| 2005/0044031 A1 | 2/2005 | Lebedev |
| 2005/0055304 A1 | 3/2005 | Lutnick et al. |
| 2005/0055305 A1 | 3/2005 | Lutnick et al. |
| 2005/0075898 A1 | 4/2005 | Wasserman et al. |
| 2005/0091142 A1 | 4/2005 | Renton et al. |
| 2005/0119966 A1 | 6/2005 | Sandholm et al. |
| 2005/0125326 A1 | 6/2005 | Nangalia et al. |
| 2005/0125329 A1 | 6/2005 | Gerhart et al. |
| 2005/0154630 A1 | 7/2005 | Lin et al. |
| 2005/0160032 A1 | 7/2005 | Lutnick et al. |
| 2005/0171887 A1 | 8/2005 | Daley et al. |
| 2005/0171888 A1 | 8/2005 | Daley et al. |
| 2005/0171889 A1 | 8/2005 | Daley et al. |
| 2005/0171890 A1 | 8/2005 | Daley et al. |
| 2005/0171891 A1 | 8/2005 | Daley et al. |
| 2005/0222936 A1 | 10/2005 | Panariti et al. |
| 2005/0289043 A1 | 12/2005 | Maudlin |
| 2006/0015436 A1 | 1/2006 | Burns et al. |
| 2006/0015441 A1 | 1/2006 | Burkhardt et al. |
| 2006/0026090 A1 | 2/2006 | Balabon |
| 2006/0059079 A1 | 3/2006 | Howorka |
| 2006/0080222 A1 | 4/2006 | Lutnick et al. |
| 2006/0085319 A1 | 4/2006 | Nangalia et al. |
| 2006/0136318 A1 | 6/2006 | Rafieyan et al. |
| 2006/0149662 A1 | 7/2006 | Nordlicht et al. |
| 2006/0190386 A1 | 8/2006 | Levy |
| 2006/0218071 A1 | 9/2006 | Sweeting |
| 2006/0253379 A1 | 11/2006 | Adcock et al. |
| 2006/0253381 A1 | 11/2006 | Adcock et al. |
| 2006/0253382 A1 | 11/2006 | Adcock et al. |
| 2006/0253882 A1 | 11/2006 | Chen et al. |
| 2006/0259404 A1 | 11/2006 | Brumfield et al. |
| 2006/0277136 A1 | 12/2006 | O'Connor et al. |
| 2006/0277137 A1 | 12/2006 | Claus et al. |
| 2007/0005481 A1 | 1/2007 | Kedia et al. |
| 2007/0005484 A1 | 1/2007 | Waelbroeck et al. |
| 2007/0100734 A1 | 5/2007 | Berger et al. |
| 2007/0118464 A1 | 5/2007 | Avery |
| 2007/0130048 A1 | 6/2007 | Claus et al. |
| 2007/0130050 A1 | 6/2007 | Claus et al. |
| 2007/0156574 A1 | 7/2007 | Marynowski et al. |
| 2007/0156754 A1 | 7/2007 | Marynowski et al. |
| 2007/0174179 A1 | 7/2007 | Avery |
| 2007/0219898 A1 | 9/2007 | Burkhardt et al. |
| 2008/0015974 A1 | 1/2008 | Balabon |
| 2008/0097893 A1 | 4/2008 | Walsky et al. |
| 2008/0319891 A1 | 12/2008 | Scheinberg et al. |
| 2011/0029335 A1 | 2/2011 | Lutnick et al. |
| 2011/0071937 A1 | 3/2011 | Claus et al. |
| 2011/0270736 A1 | 11/2011 | Claus et al. |
| 2012/0209758 A1 | 8/2012 | Adcock et al. |
| 2013/0185185 A1 | 7/2013 | Tilly et al. |
| 2013/0304625 A1 | 11/2013 | Claus et al. |
| 2014/0089018 A1 | 3/2014 | Lutnick et al. |

FOREIGN PATENT DOCUMENTS

| | | |
|---|---|---|
| EP | 1081614 A2 | 3/2001 |
| EP | 1321870 A1 | 6/2003 |
| GB | 2366637 | 3/2002 |
| GB | 2389687 | 12/2003 |
| GB | 2411492 | 8/2005 |
| JP | 2003-524241 | 8/2001 |
| JP | 2002-007707 | 1/2002 |
| JP | 2002-007782 | 1/2002 |
| JP | 2002-063402 | 2/2002 |
| JP | 2002-133113 | 5/2002 |
| JP | 2002-183446 | 6/2002 |
| JP | 2002-197283 | 7/2002 |
| JP | 2002-203112 | 7/2002 |
| JP | 2002-230304 | 8/2002 |
| JP | 2002-259761 | 9/2002 |
| JP | 2002-269349 | 9/2002 |
| JP | 2002-542543 | 12/2002 |
| JP | 2003-058733 | 2/2003 |
| JP | 2003-058741 | 2/2003 |
| JP | 2003-515824 | 5/2003 |
| JP | 2003-522992 | 7/2003 |
| JP | 2003-525480 | 8/2003 |
| JP | 2003-331188 | 11/2003 |
| JP | 3493193 | 11/2003 |
| JP | 2003345987 | 12/2003 |
| JP | 2008050963 A | 10/2012 |
| JP | 2012156384 A | 11/2014 |
| WO | WO 95/006918 | 3/1995 |
| WO | WO 00/11587 | 3/2000 |
| WO | WO 00/26834 | 5/2000 |
| WO | WO 00/63814 | 10/2000 |
| WO | WO/2000/067172 | 11/2000 |
| WO | WO/2000/077670 | 12/2000 |
| WO | WO 01/04817 | 1/2001 |
| WO | WO 01/09757 | 2/2001 |
| WO | WO 01/25996 | 4/2001 |
| WO | WO 01/48655 A1 | 7/2001 |
| WO | WO 01/52150 | 7/2001 |
| WO | WO 01/54037 | 7/2001 |
| WO | WO 01/55938 | 8/2001 |
| WO | WO/2001/055923 | 8/2001 |
| WO | WO 2001/057612 | 8/2001 |
| WO | WO 01/75752 | 10/2001 |
| WO | WO 01/77946 | 10/2001 |
| WO | WO 2001/088808 | 11/2001 |
| WO | WO 2001/093169 A1 | 12/2001 |
| WO | WO 02/071297 A1 | 9/2002 |
| WO | WO 02/086657 A2 | 10/2002 |
| WO | WO 2003/001325 | 1/2003 |
| WO | WO 2004/008296 | 1/2004 |
| WO | WO 2004/008309 | 1/2004 |

(56) References Cited

FOREIGN PATENT DOCUMENTS

| WO | WO 2004/68272 | 8/2004 |
|---|---|---|
| WO | WO 2005/083603 | 9/2005 |
| WO | WO 2007/019404 | 2/2007 |
| WO | WO 2008/109224 | 9/2008 |

OTHER PUBLICATIONS

U.S. Appl. No. 60/706,109, filed Aug. 2005, Noviello.
Australian Examiner's Report for AU Application No. 2006278384 dated, Aug. 5, 2009 (3 pages).
Australian Examiner's Report for Application No. 2005208978, dated Nov. 26, 2009 (1 page).
Australian Examiner's Report for Application No. 2005208980, dated Nov. 17, 2009 (2 pages).
Australian Examiner's Report for Application No. 2005208981, dated Dec. 14, 2009 (3 pages).
George Simon & Kathryn Trikla, "The Regulation of Specialists and Implications for the Future," Business Lawyer, Nov. 2005, pp. 217-387.
The 'Hybrid Approach': A review of NYSE's Market Structure Proposal, Mondaq Business Briefing, NA, Dec 9, 2004.
Australian Examiner's Report for Application No. 2006278382, dated Jul. 9, 2009 (3 pages).
International Preliminary Report on Patentability for PCT Application No. PCT/US05/03159, dated Jul. 31, 2006 (6 pages).
International Preliminary Report on Patentability for PCT Application No. PCT/US05/03163, dated Jan. 23, 2007 (5 pages).
International Preliminary Report on Patentability for PCT Application No. PCT/US05/03164, dated Jan. 9, 2007 (4 pages).
International Preliminary Report on Patentability for PCT Application No. PCT/US05/03166, dated Jul. 31, 2006 (4 pages).
International Preliminary Report on Patentability for PCT Application No. PCT/US05/03168, dated Feb. 13, 2007 (4 pages).
International Preliminary Report on Patentability for PCT Application No. PCT/US06/30636, dated Feb. 5, 2008 (5 pages).
International Preliminary Report on Patentability for PCT Application No. PCT/US06/30638, dated Feb. 5, 2008 (5 pages).
Japanese Office Action with English translation for Application No. 2006-551587, dated Apr. 20, 2010 (6 pages).
Japanese Office Action with English translation for Application No. 2006-551589, dated Apr. 20, 2010 (6 pages).
Japanese Office Action with English translation for Application No. 2006-551590, dated Apr. 20, 2010 (6 pages).
Japanese Office Action with English translation for Application No. 2006-551591, dated Apr. 20, 2010 (6 pages).
New AZX Session, Trader's v10 n130, Oct. 1997, p. 4 (p. 20 of EIC search).
Scientific and Technical Information Center's Search Report EIC 3600, dated Jul. 9, 2009 (88 pages).
Supplementary European Search Report for Application No. EP 05712558, dated Dec. 5, 2008 (2 pages).
The New Trading Landscape for Institutional Investors, Institutional Trades Can Be Costly If Investors Aren't Careful, Norman Harris, Institutional Investor 36, 5, S1 (7) May 2002 (p. 21 of EIC search).
Japanese Office Action with English translation for Application No. 2008-525266, dated Sep. 21, 2010 (7 pages).
Australian Examiner's Report for Application No. 2005208977, dated Dec. 2, 2010 (1 page).
Australian Examiner's Report for Application No. 2005208977, dated Nov. 20, 2009 (8 pages).
Australian Examiner's Report for Application No. 2005208979, dated Nov. 13, 2009 (2 pages).
Australian Notice of Acceptance for Application No. 2005208978, dated Nov. 30, 2010 (3 pages).
Australian Notice of Acceptance for Application No. 2005208979, dated Dec. 20, 2010 (3 pages).
Australian Notice of Acceptance for Application No. 2005208980, dated Sep. 23, 2010 (3 pages).
Australian Notice of Acceptance for Application No. 2005208981, dated Dec. 14, 2010 (3 pages).
Daisuke Ochiai, "Electronic Finance and Security Trading, 'London Stock Exchange Transfers to New Trading System'", Capital Market Quarterly, Autumn 1997, vol. 1, No. 2, Nomura Research Institute, Nov. 1, 1997, pp. 102-108.
Donald L. Luskin, Index Options & Futures: The Complete Guide, Toyo Keizai, Inc., Aug. 9, 1990, p. 32-35 [translation of an English book, originally published by John Wiley & Sons, Inc., 1987].
EPO: "Mitteilung des Europaischen Patentamts vom 1. Oct. 2007 Ober Geschaftsmethoden =Notice from the European Patent Office dated Oct. 1, 2007 concerning business methods =Communique de l'Office europeen des brevets, en date du Oct. 1, 2007, concernant les methodes dans le domaine des activites"Journal Officiel De L'Office Europeen Des Brevets.Official Journal of the European Patent Office.Amtsblattt Des Europaeischen Patentamts, OEB, Munchen, DE, vol. 30, No. 11, Nov. 1, 2007 (Nov. 1, 2007) , pp. 592-593, XP0079055251SSN: 0170-9291 (2 pages).
European Patent Office Communication and Extended European Search Report for Application No. 06789488.1, dated Jul. 6, 2010 (10 pages).
European Patent Office Communication and Extended European Search Report for Application No. 06789490.7, dated Jul. 7, 2010 (8 pages).
European Patent Office Communication and Official Action for Application No. 05712558.5, dated May 18, 2010 (6 pages).
European Patent Office Communication and Official Action for Application No. 05712562.7, dated May 18, 2010 (6 pages).
European Patent Office Communication and Official Action for Application No. 05712563.5, dated May 18, 2010 (6 pages).
Japanese Office Action with English translation for Application No. 2006-551587, dated Nov. 24, 2010 (6 pages).
Japanese Office Action with English translation for Application No. 2006-551588, dated Apr. 27, 2010 (8 pages).
Japanese Office Action with English translation for Application No. 2006-551588, dated Aug. 31, 2010 (8 pages).
Japanese Office Action with English translation for Application No. 2006-551589, dated Aug. 31, 2010 (7 pages).
Japanese Office Action with English translation for Application No. 2006-551589, dated Dec. 7, 2010 (6 pages).
Japanese Office Action with English translation for Application No. 2006-551590, dated Aug. 24, 2010 (6 pages).
Japanese Office Action with English translation for Application No. 2006-551591, dated Aug. 24, 2010 (4 pages).
Japanese Office Action with English translation for Application No. 2008-525268, dated Nov. 24, 2010 (7 pages).
Australian Notice of Acceptance for Application No. 2006278382, dated Apr. 11, 2011 (3 pages).
Japanese Office Action with English translation for Application No. 2006-551590, dated Jan. 11, 2011 (4 pages).
Japanese Office Action with English translation for Application No. 2006-551591, dated Jan. 11, 2011 (4 pages).
Japanese Office Action with English translation for Application No. 2006-551587, dated Jul. 12, 2011 (6 pages).
Japanese Office Action with English translation for Application No. 2006-551588, dated Apr. 26, 2011 (6 pages).
Japanese Office Action with English translation for Application No. 2008-525266, dated Jun. 28, 2011 (7 pages).
Japanese Office Action with English translation for Application No. 2008-525268, dated Jun. 21, 2011 (4 pages).
AU Examination Report for Application No. 2006254819 dated Oct. 28, 2010; 2 pages.
AU Examination Report for Application No. 2007201453 dated Jul. 30, 2010; 1 page.
Australian Examiner's Report for AU Application No. 2006278384 dated, May 3, 2011 (2 pages).
Australian Notice of Acceptance for Application No. 2005208977, dated Aug. 24, 2011 (3 pages).
Bongiovanni, et al.: Lets Play Hide-and-Seek: The Location and Size of Undisclosed Limit Order Volume, The Journal of Trading, Summer 2006, pp. 34-46.
European Communication and Search Report for Application No. 07754165.4 dated May 26, 2011; 9 pages.

(56) References Cited

OTHER PUBLICATIONS

European Communication and Supplementary Search Report for Application No. 06772668.7 dated Aug. 20, 2009; 5 pages; (this app has been Abandoned).
Fukutome, et. al., "Bidding market based on single price model with network constraints," IEEE, pp. 1245-1250 plus 4 pages; 2004.
Hasbrouck et al.: Limit orders and volatility in a Hybrid Market: The Island ECN, Department of Finance, Stern School, NYU, Sep. 26, 2001, pp. 1-54.
Hendershott, T.: Electronic Trading in Financial Market, Jul./Aug. 2003, IT Pro, IEEE Computer Society, pp. 1-5.
International Preliminary Report for International Application No. PCT/US2006/022441, dated Dec. 11, 2007 (5 pages).
International Preliminary Report for International Application No. PCT/US2007/007602, dated Oct. 8, 2008 (5 pages).
International Search Report and the Written Opinion for International Application No. PCT/US06/22441; 5 pages; dated May 1, 2007.
International Search Report and the Written Opinion for International Application No. PCT/US07/07602; 5 pages; dated Sep. 24, 2007.
Japanese Notice of Allowance for Application No. 2008-525268, dated Nov. 22, 2011 (3 pages).
Japanese Office Action with English translation for Application No. 2007-097157; dated Jun. 20, 2011 (4 pages).
Japanese Office Action with English translation for Application No. 2008-515959, dated Sep. 6, 2011 (6 pages).
Lee, et. al., "R-Trader: An Automatic Stock Trading System Based on Reinforcement Learning," The British Library, pp. 785-794, (Abstract translated).
Lin, et. al., "The Applications of Genetic Algorithms in Stock Market Data Mining Optimisation," Faculty of Information Technology, University of Technology, 9 pages; 2000.
Market Access Subcommittee: Best Practices for Organized Electronic Markets, Commodity Futures Trading Commission, Nov. 27, 2001, pp. 1-22.
NASDAQ: SuperMontage Release 1.0—Functional Description, Version 2.0, 2001, pp. 1-15.
Schmerken; Cybercorp to Introduce Trading via CBOE; Wall Street & technology; coversheet plus page 50; Jan. 2000.
Steiner, et. al., "Portfolio optimization with a neural network implementation of the coherent market hypothesis," The British Library, Elsevier Science B.V., pp. 27-40; rev. Nov. 11, 1995.
Tan, "Using genetic algorithm to optimize an oscillator-based market timing system," The British Library, pp. B115-B122.
Wachi, et. al., "Application for Single price auction model (SPA) in AC Network," pp. 81-89; 2005.
Wallman; Technology Takes to Securities TradingIIEE, Spectrum; pp. 60-65; Feb. 1997.
Ye, et. al., Application of Genetic Algorithm to Optimal Portfolio with Risk Control,: The British Library, pp. 351-354.
Zeroual; An Open Distributed Request Propagation Approach for Trading Services; Proceedings of the Second International Conference on Machine Learning and Cybernetics, Xi'an; pp. 3253-3258; Nov. 2003.
Balance of Trade, Banking Technology, vol. 20, No. 9 ISSN 0266-0865, Nov. 1, 2004; pp. 42-44.
European Patent Office Examination Report for Application No. 05712564.3-1238; dated Nov. 14, 2007 (5 pages).
European Patent Office Examination Report for Application No. 05712566.8-1238; dated Nov. 14, 2007 (5 pages).
Notification of Transmittal of International Search Report and Written Opinion for PCT Application No. PCT/US05/03159; dated Feb. 24, 2006, (11 pages).
Notification of Transmittal of International Search Report and Written Opinion for PCT Application No. PCT/US05/03163; dated Jan. 4, 2007 (9 pages).
Notification of Transmittal of International Search Report and Written Opinion for PCT Application No. PCT/US05/03164; dated Dec. 13, 2006 (6 pages).
Notification of Transmittal of International Search Report and Written Opinion for PCT Application No. PCT/US05/03166; dated Nov. 4, 2005 (7 pages).
Notification of Transmittal of International Search Report and Written Opinion for PCT Application No. PCT/US05/03168; dated Jan. 29, 2007 (6 pages).
Notification of Transmittal of International Search Report and Written Opinion for PCT Application No. PCT/US06/30638; dated Apr. 20, 2007 (8 pages).
Parlour, Christine, Price Dynamics in Limit Order Markets, Queens University, Kingston Ontario Canada, Nov. 1, 1995 (111 pages).
Supplementary European Search Report for Application No. 05712562.7; dated Jul. 28, 2008 (2 pages).
Supplementary European Search Report for Application No. 05712563.5; dated Jul. 28, 2008 (2 pages).
Supplementary European Search Report for International Application No. PCT/US05/03166; dated Jan. 8, 2007 (3 pages).
Vergote, et. al. How to match Trades and Quotes for NYSE Stocks, Mar. 2005 (21 pages).
Weber, Bruce; Screen-Based Trading in Futures Markets: Recent Developments and Research Propositions, Abstract, ISBN 076950013, Jun. 21, 2005 (1 page).
Notification of Transmittal of International Search Report and Written Opinion for PCT Application No. PCT/US06/30636; dated Apr. 30, 2007; 8 pages.
USPTO Office Action for U.S Appl. No. 10/766,965, dated Nov. 21, 2008 (20 pages).
USPTO Office Action for U.S. Appl. No. 11/499,833, dated Aug. 18, 2009 (15 pages).
USPTO Office Action for U.S. Appl. No. 11/499,833, dated May 19, 2008 (12 pages).
USPTO Office Action for U.S. Appl. No. 11/499,833, dated Nov. 14, 2008 (14 pages).
USPTO Office Action for U.S. Appl. No. 10/767,699, dated Oct. 20, 2008 (3 pages).
USPTO Examiner Interview Summary for U.S. Appl. No. 10/766,965, dated Sep. 22, 2009 (2 pages).
USPTO Examiner Interview Summary for U.S. Appl. No. 10/767,649, dated Jun. 23, 2009 (2 pages).
USPTO Examiner Interview Summary for U.S. Appl. No. 11/499,833, dated Sep. 3, 2009 (2 pages).
USPTO Office Action for U.S. Appl. No. 10/766,965, dated Oct. 28, 2009 (2 pages).
USPTO Office Action for U.S. Appl. No. 10/767,546, dated Oct. 7, 2009 (19 pages).
USPTO Office Action for U.S. Appl. No. 10/767,588, dated Oct. 27, 2009 (6 pages).
USPTO Examiner Interview Summary for U.S. Appl. No. 10/767,699, dated Dec. 23, 2009 (3 pages).
USPTO Examiner's Answer to Appeal Brief for U.S. Appl. No. 10/767,699, dated Dec. 24, 2009 (16 pages).
USPTO Examiner's Answer to Appeal Brief for U.S. Appl. No. 10/766,965, dated Jan. 20, 2010 (19 pages).
USPTO Office Action for U.S. Appl. No. 10/767,649, dated Aug. 27, 2009 (20 pages).
USPTO Notice of Allowance and Fees Due for U.S. Appl. No. 11/499,833, dated Mar. 12, 2010 (9 pages).
USPTO Office Action for U.S. Appl. No. 10/767,699, dated Dec. 22, 2010 (13 pages).
USPTO Dismissal of Appeal for U.S. Appl. No. 10/766,965, dated Jun. 7, 2010 (3 pages).
USPTO Notice of Allowance and Fees Due for U.S. Appl. No. 10/767,588, dated Jul. 22, 2010 (7 pages).
USPTO Notice of Allowance and Fees Due for U.S. Appl. No. 10/767,588, dated Jun. 25, 2010 (7 pages).
USPTO Notice of Allowance and Fees Due for U.S. Appl. No. 10/767,588, dated Sep. 21, 2010 (7 pages).
USPTO Notice of Allowance and Fees Due for U.S. Appl. No. 10/767,588, dated Sep. 7, 2010 (3 pages).
USPTO Notice of Allowance and Fees Due for U.S. Appl. No. 11/499,833, dated Sep. 15, 2010 (10 pages).
USPTO Office Action for U.S. Appl. No. 10/767,546, dated Aug. 6, 2010 (39 pages).

(56) References Cited

OTHER PUBLICATIONS

USPTO Office Action for U.S. Appl. No. 10/767,546, dated May 20, 2011 (47 pages).
USPTO Office Action for U.S. Appl. No. 10/767,699, dated Sep. 15, 2011 (13 pages).
USPTO Notice of Allowance and Fees Due for U.S. Appl. No. 12/953,407, dated Oct. 19, 2011 (7 pages).
USPTO Notice of Allowance and Fees Due for U.S. Appl. No. 12/953,407, dated Oct. 7, 2011 (8 pages).
USPTO Notice of Allowance for U.S. Appl. No. 11/146,646; 7 pages; dated Sep. 16, 2010.
USPTO Office Action for U.S. Appl. No. 12/953,407, dated Mar. 14, 2011 (15 pages).
USPTO Office Action for U.S. Appl. No. 11/146,646; 12 pages; dated Jan. 26, 2009.
USPTO Office Action for U.S. Appl. No. 11/146,646; 13 pages; dated Jan. 19, 2010.
USPTO Office Action for U.S. Appl. No. 11/398,241; 11 pages; dated Dec. 15, 2008.
USPTO Office Action for U.S. Appl. No. 11/398,241; 14 pages; dated Oct. 14, 2009.
USPTO Pre-Brief Appeal Conference Decision for U.S. Appl. No. 11/398,241; 2 pages; dated May 17, 2010.
USPTO Examiner Interview Summary for U.S. Appl. No. 11/499,496, dated Jul. 27, 2009 (4 pages).
USPTO Notice of Allowance and Fees Due and Examiner Interview Summary for U.S. Appl. No. 11/499,496, dated Feb. 17, 2010 (89 pages).
USPTO Office Action for U.S. Appl. No. 11/499,496, dated Apr. 27, 2009 (3 pages).
USPTO Office Action for U.S. Appl. No. 11/499,496, dated Jan. 26, 2009 (16 pages).
USPTO Supplemental Notice of Allowance and Fees Due for U.S. Appl. No. 11/499,496, dated Aug. 10, 2010 (4 pages).
USPTO Supplemental Notice of Allowance and Fees Due for U.S. Appl. No. 11/499,496, dated Jul. 23, 2010 (9 pages).
USPTO Supplemental Notice of Allowance and Fees Due for U.S. Appl. No. 11/499,496, dated May 26, 2010 (4 pages).
USPTO Office Action for U.S. Appl. No. 10/766,965, dated Feb. 7, 2008 (49 pages).
USPTO Office Action for U.S. Appl. No. 10/767,546, dated Feb. 4, 2008, (48 pages).
USPTO Office Action for U.S. Appl. No. 10/767,588, dated Jan. 11, 2008 (19 pages).
USPTO Office Action for U.S. Appl. No. 10/767,649, dated Mar. 3, 2008 (24 pages).
USPTO Office Action for U.S. Appl. No. 10/767,699, dated Oct. 26, 2007 (22 pages).
USPTO Office Action for U.S. Appl. No. 10/767,699, dated Jul. 22, 2008 (13 pages).
USPTO Office Action for U.S. Appl. No. 10/767,546, dated Oct. 29, 2008 (35 pages).
USPTO Office Action for U.S. Appl. No. 10/767,588, dated Oct. 23, 2008 (8 pages).
USPTO Office Action for U.S. Appl. No. 11/499,496, dated May 1, 2008 (12 pages).
Australian Examiner's Report for AU Application No. 2011204904 dated Oct. 15, 2012 (3 pages).
Canadian Examination Report for 2,554,179 dated Jan. 18, 2012 (3 pages).
Canadian Examination Report for 2,554,241 dated Aug. 6, 2012 (4 pages).
Canadian Examination Report for 2,554,244 dated May 16, 2012 (3 pages).
Canadian Examination Report for 2,554,250 dated Jul. 30, 2012 (3 pages).
Canadian Examination Report for 2,554,468 dated Jul. 10, 2012 (6 pages).
Canadian Examination Report for 2,583,825 dated Oct. 18, 2012 (4 pages).
Canadian Examination Report for 2,617,787 dated Apr. 2, 2012 (4 pages).
Canadian Examination Report for 2,617,797 dated Feb. 14, 2012 (3 pages).
European Examination Report for Application No. 07754165.4 dated Apr. 20, 2012 (7 pages).
Japanese Office Action with English translation for Application No. 2006-551587, dated Jan. 31, 2012 (9 pages).
Japanese Office Action with English translation for Application No. 2006-551587, dated Oct. 2, 2012 (8 pages).
Japanese Office Action with English translation for Application No. 2006-551588, dated Nov. 14, 2012 (4 pages).
Japanese Office Action with English translation for Application No. 2008-515959, dated Jul. 18, 2012 (9 pages).
USPTO Examiner's Answer to Appeal Brief for U.S. Appl. No. 10/767,546, dated Sep. 14, 2012 (48 pages).
USPTO Office Action for U.S. Appl. No. 10/767,699, dated May 24, 2012 (5 pages).
USPTO Office Action for U.S. Appl. No. 12/945,046, dated Mar. 1, 2012 (7 pages).
USPTO Office Action for U.S. Appl. No. 13/412,063, dated Oct. 4, 2012 (9 pages).
USPTO Notice of Allowance for U.S. Appl. No. 12/945,046; dated Oct. 24, 2012 (6 pages).
Japanese Office Action with English translation for Application No. 2011-096192, dated Feb. 19, 2013 (6 pages).
Japanese Office Action with English translation for Application No. 2011-231889, dated Feb. 19, 2013 (7 pages).
Ayanian, et al., "The Search for Best Execution in Today's Market Environment", Jun. 6, 2002, Morgan Lewis Counselors at Law, pp. 1-18.
Hong, et al., "Strategic Trading and Learning about Liquidity", 2002, Journal of Financial Markets 5, pp. 419-450.
USPTO Office Action for U.S. Appl. No. 10/767,699, dated Jan. 29, 2013 (19 pages).
USPTO Notice of Allowance and Fees Due for U.S. Appl. No. 11/499,833, dated Mar. 15, 2013 (13 pages).
USPTO Notice of Allowance and Fees Due and Examiner Interview Summary for U.S. Appl. No. 11/499,496, dated Mar. 6, 2013 (14 pages).
USPTO Notice of Allowance and Fees Due for U.S. Appl. No. 10/767,546, dated Jun. 24, 2013 (11 pages).
USPTO Notice of Allowance and Fees Due for U.S. Appl. No. 13/412,063, dated Jun. 24, 2013 (22 pages).
USPTO Office Action for U.S. Appl. No. 10/766,965, dated Jun. 20, 2013 (15 pages).
USPTO Office Action for U.S. Appl. No. 10/767,649, dated Jul. 8, 2013 (10 pages).
Australian Examination Report for 2011250751, dated Mar. 13, 2014, 3 pages.
Australian Examination Report for 2012204120, dated Dec. 17, 2013, 3 pages.
Australian Examiner's Report for AU Application No. 2012202466 dated Sep. 26, 2013 (2 pages).
Australian Examiner's Report for AU Application No. 2012207031 dated Feb. 12, 2014 (2 pages).
Canadian Examination Report for 2,554,179 dated Nov. 14, 2013 (3 pages).
Canadian Examination Report for 2,554,241 dated Mar. 10, 2014 (4 pages).
Canadian Examination Report for 2,554,244 dated Mar. 4, 2014 (4 pages).
Canadian Examination Report for 2,554,250 dated Feb. 18, 2014 (2 pages).
Canadian Examination Report for 2,554,468, dated Nov. 26, 2013 (4 pages).
Canadian Examination Report for 2,583,825 dated Jan. 14, 2014 (4 pages).
Canadian Examination Report for 2,609,200 dated Aug. 21, 2013 (4 pages).
Canadian Examination Report for 2,617,787 dated Nov. 22, 2013 (3 pages).

(56) References Cited

OTHER PUBLICATIONS

Canadian Examination Report for 2,617,797 dated Oct. 17, 2013 (2 pages).
Japanese Office Action with English translation for Application No. 2011-231889, dated Sep. 3, 2013 (4 pages).
USPTO Notice of Allowance and Fees Due for U.S. Appl. No. 10/767,546, dated Nov. 22, 2013 (10 pages).
Japanese Office Action with English translation for Application No. 2011-231889, dated Mar. 25, 2014 (4 pages).
Australia Direction to Request Examination Report for Application No. 2016202851 dated May 10, 2016 (1 page).
Australia First Examination Report for Application No. 2015203516 dated Sep. 7, 2016 (2 pages).
Australia First Examination Report for Application No. 2015227416 dated Nov. 12, 2016 (3 pages).
Australia First Examination Report for Application No. 2015255245 dated Oct. 17, 2016 (3 pages).
Australia First Examination Report for Application No. 2015268685 dated Sep. 21, 2016 (3 pages).
Australian Examination Report for Application No. 2014203836 dated May 5, 2015 (6 pages).
Canadian Examination Report for 2,554,179 dated Mar. 10, 2015 (4 pages).
Canadian Examination Report for 2,554,250 dated Mar. 19, 2015 (8 pages).
Canadian Examination Report for 2,554,468, dated Feb. 11, 2015 (3 pages).
Canadian Examination Report for 2,617,797 dated Apr. 26, 2016 (6 pages).
Canadian Examination Report for 2,617,797 dated Dec. 4, 2014 (4 pages).
Canadian Examination Report for 2609200 dated Sep. 12, 2016 (6 pages).
Canadian Examination Report for Application No. 2,538,825 dated Jul. 26, 2017 (10 pages).
Canadian Examination Report for Application No. 2,609,200 dated Jul. 28, 2014 (5 pages).
Canadian Examination Report for Application No. 2,617,787 dated Mar. 26, 2015 (5 pages).
Canadian Final Action for 2617787 dated Sep. 23, 2016 (6 pages).
Canadian Final Action for Application No. 2,554,241 dated Mar. 1, 2018 (10 pages).
Canadian Final Action for Application No. 2,554,244 dated Mar. 1, 2018 (8 pages).
Canadian Final Action for Application No. 2,609,200 dated Sep. 18, 2017 (8 pages).
Canadian Notice of Allowance for 2554250 dated Mar. 22, 2017 (1 page).
Canadian Patent Appeal Board Action for 2617787 dated Mar. 13, 2017 (4 pages).
Notice of Allowance for CA Application No. 2554179; dated Feb. 5, 2018; 1 page.
Allen et al.: Electronic Trading and Its Implications for Financial Systems, Nov. 15, 2001, pp. 1-24. (Year: 2001).
Lipson, Marc L.: Competition Among Market Centers, Dec. 2003, pp. 1-48. (Year: 2003).
Australia First Examination Report for Application No. 2016202851 dated Aug. 4, 2017 (3 pages).
Australia First Examination Report for Application No. 2017258978 dated Dec. 13, 2018 (3 pages).
Australia Second Examination Report for Application No. 2015203516 dated Aug. 4, 2017 (2 pages).
Australia Second Examination Report for Application No. 2015255245 dated Aug. 16, 2017 (3 pages).
Canadian Examiners Report for 2554468 dated Feb. 10, 2017 (6 pages).
Canadian Examiners Report for 2620979 dated Jul. 21, 2017, (6 pages).
Canadian Patent Appeal Office Action for 2609200 dated Apr. 27, 2018, (6 pages).
Canadian Examiners Report for 2554241 dated Nov. 21, 2016 (8 pages).
Zhongxing Ye, Yijun Zhang, Application of Genetic Algorithm Tooptimal Portfolio With Risk Control, vol. 1, pp. 351-354, Publishing House of Electron. Ind. (Beijing, China), 1995.
SEC.gov: Nasdaq Market Center Systems Description, Sep. 7, 2004, pp. 1-23 (Year: 2004).
InteractiveBrokers: Intermarket Sweep, Jun. 29, 2005, pp. 1-12 (Year: 2005).
Biais et al.: Imperfect Competition in Financial Market: ISLAND vs NASDAQ, Nov. 2003, Carnegie Mellon University, pp. 1-41. (Year: 2003).
NASDAQ: Top NASDAQ Participants, Jun. 2012, pp. 1-2. (Year: 2012).

* cited by examiner

| Trading Product | | Quantity | Unit Price | Quality Score 150 | Quality Threshold 160 |
|---|---|---|---|---|---|
| Trading Order 12a | Product X | 11 million units | $11.00 | 5 | 6 |
| Trading Order 12b | Product X | 125 million units | $12.00 | 9 | 6 |

# SYSTEM AND METHOD FOR OPTIMIZING EXECUTION OF TRADING ORDERS

CROSS REFERENCE TO RELATED APPLICATION

This patent application is a continuation of U.S. patent application Ser. No. 13/180,010 filed on Jul. 11, 2011 which is a continuation of U.S. patent application Ser. No. 11/398,241 filed Apr. 4, 2006 (now U.S. Pat. No. 7,979,339 issued on Jul. 12, 2011), which is hereby incorporated by reference herein in its entirety.

TECHNICAL FIELD OF THE INVENTION

The present invention relates generally to electronic trading and more specifically to a system and method for optimizing execution of trading orders.

BACKGROUND OF THE INVENTION

In recent years, electronic trading systems have gained widespread acceptance for the trading of a variety of items, such as goods, services, financial instruments, and commodities. Electronic trading systems generally receive and process trading orders from traders. Occasionally, traders submit low quality or unrealistic trading orders. Such trading orders specify criteria that vary widely from prevailing market conditions. For example, if the prevailing market price for a particular trading product is $25.00 per unit, a trading order to buy the particular trading product for $8.00 per unit may be considered an unrealistic trading order. Unrealistic trading orders do not typically result in quickly executed transactions. Instead, unrealistic trading orders usually remain unfilled for long periods of time. As a result, unrealistic trading orders do not increase liquidity in the market place.

Electronic trading systems typically process trading orders received from traders according to "first-in, first-out" (FIFO) principles. Based on FIFO principles, electronic trading systems process trading orders in the order in which they are received from traders. As a result, if a realistic trading order (i.e., a trading order that is likely to result in a quickly executed transaction) is received shortly after an unrealistic trading order (i.e., a trading order that is unlikely to be filled quickly), the realistic trading order must wait while the electronic trading system first processes the unrealistic trading order. This delay in processing the realistic trading order may decrease liquidity in the market place.

SUMMARY OF THE INVENTION

In accordance with the present invention, the disadvantages and problems associated with prior electronic trading systems have been substantially reduced or eliminated.

A system for processing trading orders comprises an optimizer module operable to receive a first trading order and a second trading order. The optimizer module is further operable to receive market data associated with at least one market center. The optimizer module is further operable to determine whether to transmit the second trading order to the at least one market center prior to transmitting the first trading order to the at least one market center, the determination based at least in part on the market data.

Various embodiments of the present invention may benefit from numerous advantages. It should be noted that one or more embodiments may benefit from some, none, or all of the advantages discussed below. One advantage of the present invention is that the trading system analyzes the quality of trading orders received from traders based on current market data. Another advantage is that the trading system analyzes the quality of trading orders based on the trading system's available processing and storage capacity. The trading system assigns priority to trading orders that are most likely to result in quickly executed transactions. In some embodiments, the trading system filters out trading orders that are unlikely to result in timely executed transactions. By assigning priority to realistic trading orders (i.e., trading orders that are likely to result in quickly executed transactions), the trading system reduces the processing time for realistic trading orders. The trading system may thereby increase liquidity in the market place.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF EXAMPLE EMBODIMENTS OF THE INVENTION

Figure 1:
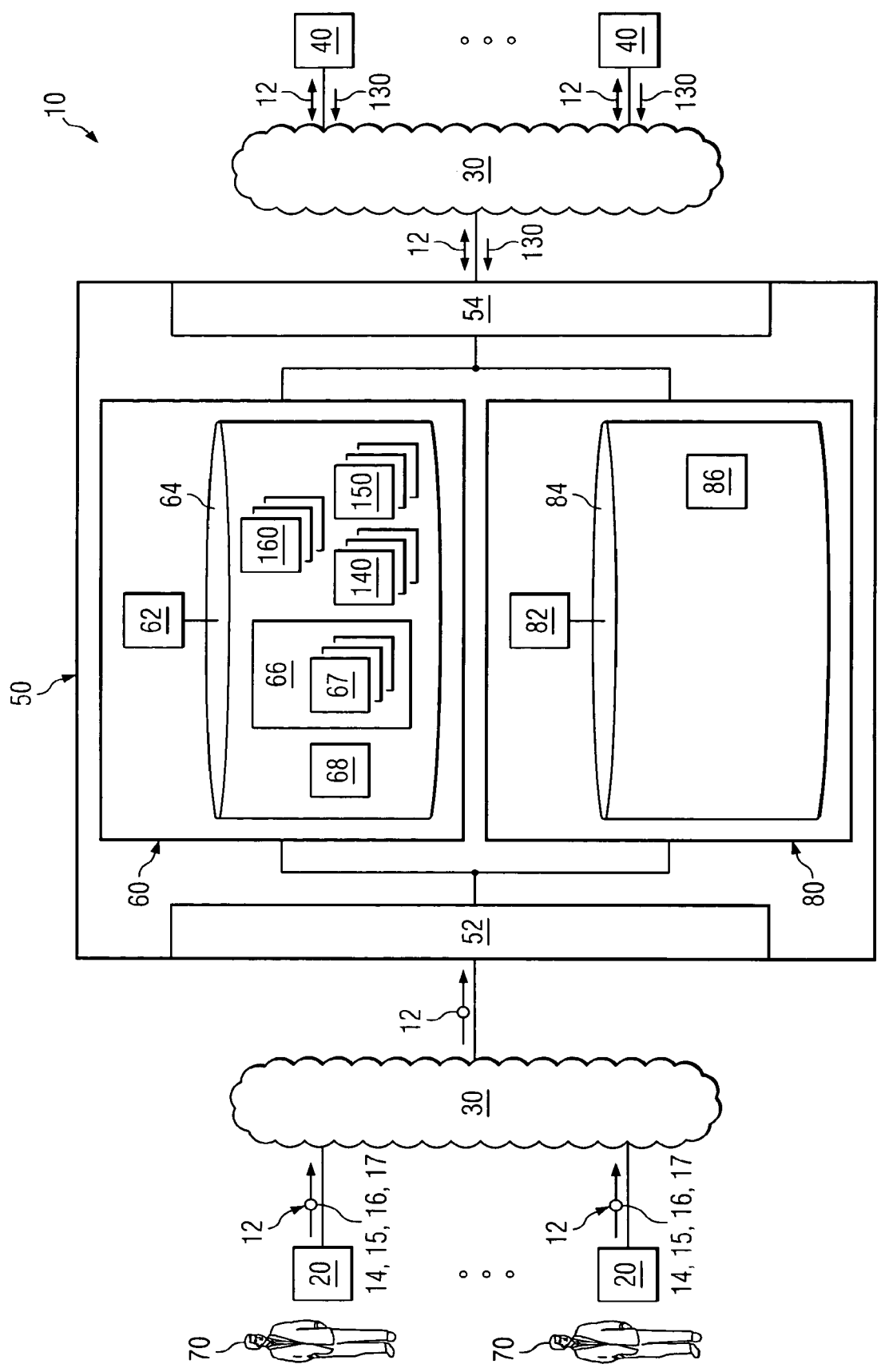
FIG. 1 illustrates a trading system according to one embodiment of the present invention.

FIG. 1 illustrates one embodiment of a trading system 10. Generally, trading system 10 comprises a trading platform 50 communicatively connected to clients 20, networks 30, and market centers 40. In order to facilitate trading, trading system 10 matches trading orders 12 placed by traders 70. Generally, trading platform 50 may determine priority among trading orders 12 based at least in part on current market conditions. By assessing current market conditions, trading platform 50 may assign priority to trading orders 12 that are most likely to result in timely executed transactions. According to certain embodiments, trading platform 50 may thereby increase the liquidity of trading products.

Clients 20 comprise any suitable local or remote end-user devices that may be used by traders 70 to access one or more elements of trading system 10, such as trading platform 50. A particular client 20 may comprise a computer, workstation, telephone, Internet browser, electronic notebook, Personal Digital Assistant (PDA), pager, or any other suitable device (wireless or otherwise), component, or element capable of receiving, processing, storing, and/or communicating information with other components of system 10. Client 20 may also comprise any suitable user interface such as a display, microphone, keyboard, or any other appropriate terminal equipment according to particular configurations and arrangements. It will be understood that there may be any number of clients 20 communicatively connected to trading platform 50. In addition, there may be any number of clients 20 communicatively connected to market centers 40 without using trading platform 50.

Clients 20 are operable to receive trading orders 12 from traders 70 and to send trading orders 12 to trading platform 50 and/or market centers 40. Trading orders 12 comprise orders and counterorders. Orders and counterorders may be "takes" 14, "bids" 15, "hits" 16, and "offers" 17. Orders and counterorders are complementary actions such as, for example, buying and selling. A bid 15 is a request to buy a particular quantity of a particular trading product at a particular price (bid price). Conversely, an offer 17 is a request to sell a particular quantity of a particular trading product at a particular price (offer price). A take 14 is a request to buy a particular quantity of a particular trading product 12 at the best offer price. Conversely, a hit 16 is a request to sell a particular quantity of a particular trading product at the best bid price. Bids 15 and offers 17 may be considered passive trading orders 12 because a bid 15 and an offer 17 generally remain in the trading books until aggressed by a corresponding take 14 or hit 16. Takes 14 and hits 16 are therefore considered aggressive trading orders 12. Although system 10 is exemplified below using equities as the trading product, the trading product that forms the basis of trading order 12 may comprise any goods, services, financial instruments, commodities, etc. Examples of financial instruments include, but are not limited to, stocks, bonds, and futures contracts.

Although clients 20 are described herein as being used by "traders" 70, it should be understood that the term "trader" is meant to broadly apply to any user of trading system 10, whether that user is an individual, a machine, an agent acting on behalf of a principal, a principal, a legal entity (such as a corporation), or any mechanism that is capable of placing and/or responding to trading orders 12 in system 10.

Networks 30 are communication platforms operable to exchange data and/or information between clients 20 and trading platform 50 and/or market centers 40. Network 30 may represent any wireless and/or wireline network which provides clients 20 with the ability to communicate trading or transaction information to trading platform 50 and/or market centers 40. Network 30 may comprise an Internet architecture. Alternatively, or in addition, network 30 may comprise a plain old telephone system (POTS). Transactions may be assisted by a broker associated with trading platform 50 or manually keyed into a telephone or, other suitable electronic device to request that a transaction be executed. In certain embodiments, network 30 may be any packet data network (PDN) offering a communications interface or exchange between any two nodes in system 10. Network 30 may further comprise any combination of local area network (LAN), metropolitan area network (MAN), wide area network (WAN), wireless local area network (WLAN), virtual private network (VPN), intranet, cellular network, private network, or any other suitable number and combination of wireless and/or wireline architectures or systems that facilitates communication between clients 20 and other components of system 10.

Market centers 40 comprise all manner of order execution venues including exchanges, Electronic Communication Networks (ECNs), Alternative Trading Systems (ATSs), market makers, or any other suitable market participants. Each market center 40 maintains a bid price and an offer price for a given trading product by standing ready, willing, and able to buy or sell that trading product at publicly quoted prices, also referred to as market center prices. Different market centers 40 may provide different market center prices for particular trading products. For example, a particular market center 40 may offer a particular bid price and/or offer price for a particular trading product, while another market center 40 may offer a different bid price and/or offer price for the same trading product. A particular market center 40 may charge a transaction cost to execute trading orders 12 that remain in the order books of that market center 40 for more than a certain length of time.

Different market centers 40 may have different policies regarding the disclosure of various details of trading orders 12. Generally, trading order 12 may comprise two parts—a "displayed quantity" and a "reserved quantity." In placing trading order 12, trader 70 may indicate that only a portion of the total quantity of trading order 12 should be displayed by trading platform 50 or market center 40 to other traders 70. This portion of trading order 12 to be displayed to other traders 70 is referred to as the "displayed quantity." The remaining portion of trading order 12 is referred to as the "reserved quantity." Designating a portion of trading order 12 as a "reserved quantity" allows trader 70 to enter a large trading order 12 while having trading platform 50 or market center 40 only display a portion of that trading order 12 to other traders 70.

Trading platform 50 is a trading architecture that facilitates the routing, matching, and other processing of trading orders 12. Trading platform 50 may comprise a management center or a headquartering office for any person, business, or entity that seeks to route, match, process, or fill trading orders 12. Accordingly, trading platform 50 may include any suitable combination of hardware, software, personnel, devices, components, elements, or objects that may be utilized or implemented to achieve the operations and functions of an administrative body or a supervising entity that manages or administers a trading environment. In certain embodiments, trading platform 50 comprises client interface 52, market interface 54, optimizer module 60, and matching module 80.

Client interface 52 of trading platform 50 is communicatively connected to network 30 and supports communications between clients 20 and the various components of trading platform 50. According to certain embodiments, client interface 52 comprises a transaction server that receives trading orders 12 communicated by clients 20 via network 30.

Market interface 54 is communicatively connected to market centers 40 and supports communications between market centers 40 and the various components of trading platform 50. Market interface 54 may comprise a transaction server that receives trading orders 12 communicated by market centers 40. In addition, market interface 54 may send to market centers 40 trading orders 12 received from clients 20 connected directly to trading platform 50. Market interface 54 may also receive market data 130 from market centers 40. Market data 130 may comprise information regarding market conditions such as, for example, trading volumes, best bid/offer prices, trends in prices, trends in trading volumes, time of entry of trading orders 12, number of outstanding trading orders 12, number of active traders 70, or any other information suitable to optimize the processing of trading orders 12 by trading platform 50.

Client interface 52 and market interface 54 may be communicatively connected to optimizer module 60 and/or matching module 80. Optimizer module 60 represents any hardware, software, firmware, or combination thereof operable to process, control, and monitor the prioritizing, sequencing, and/or filtering of trading orders 12 submitted by traders 70. Optimizer module 60 may comprise a general-purpose personal computer (PC), a workstation, a Unix-based computer, a server computer, or any other suitable processing device. Generally, optimizer module 60 receives trading orders 12 from traders 70 and prioritizes, sequences, and/or filters trading orders 12 based at least in part on market data 130, platform data 140, and/or the characteristics of trading orders 12. In particular, optimizer module 60 is capable of prioritizing and filtering trading orders 12 to optimize liquidity in market centers 40 and trading platform 50 and to optimize the efficiency of trading platform 50 and/or other trading resources. Optimizer module 60 may comprise optimizer processor 62 and optimizer memory 64. Although FIG. 1 illustrates a single optimizer module 60 in system 10, system 10 can be implemented using any suitable number and combinations of optimizer modules 60.

Optimizer processor 62 is operable to record trading orders 12 in optimizer memory 64 and to transmit trading orders 12 to matching module 80 and/or market centers 40. Optimizer processor 62 is further operable to execute rules 67 in optimizer logic 66 to prioritize, sequence, and or filter trading orders 12 based at least in part on market data 130, platform data 140, and/or the characteristics of trading orders 12. Optimizer processor 62 may comprise any suitable combination of hardware and/or software implemented in one or more modules to provide the described function or operation.

Optimizer memory 64 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as trading orders 12. Although FIG. 1 illustrates optimizer memory 64 as internal to optimizer module 60, it should be understood that optimizer memory 64 may be internal or external to components of trading system 10, depending on particular implementations. Also, optimizer memory 64 illustrated in FIG. 1 may be separate from or integral to other memory devices to achieve any suitable arrangement of memory devices for use in trading system 10.

According to certain embodiments, optimizer memory 64 comprises optimizer logic 66. Generally, optimizer logic 66 comprises rules 67 for prioritizing, sequencing, and/or filtering trading orders 12 based at least in part on market data 130, platform data 140, and/or the characteristics of trading orders 12. Rules 67 may comprise algorithms, formulas, functions, tables, or any suitable instructions for prioritizing, sequencing, and/or filtering trading orders 12 to optimize the execution of trading orders 12. By prioritizing, sequencing, and/or filtering trading orders 12, trading platform 50 may promote and increase liquidity in the marketplace and optimize the efficient use of system resources.

Matching module 80 may be communicatively coupled to client interface 52, market interface 54, and optimizer module 60. Matching module 80 represents any hardware, software, firmware, or combination thereof operable to process, control, monitor, route, and/or match trading orders 12 submitted by traders 70. Matching module 80 may comprise a general-purpose personal computer (PC), a workstation, a Unix-based computer, a server computer, or any other suitable processing device. Matching module 80 may comprise matching processor 82 and matching memory 84. Although FIG. 1 illustrates a single matching module 80 in system 10, system 10 can be implemented using any suitable number and combination of matching modules 80.

Matching processor 82 is operable to record trading orders 12 in matching memory 84 and route trading orders 12 to market centers 40. Matching processor 82 is further operable to execute matching logic 86 stored in matching memory 84 to match trading orders 12 received by client interface 52 and market interface 54. Matching processor 82 may comprise any suitable combination of hardware and/or software implemented in one or more modules to provide the described function or operation.

Matching memory 84 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as trading orders 12. Although FIG. 1 illustrates matching memory 84 as internal to trading platform 50, it should be understood that matching memory 84 may be internal or external to components of trading system 10, depending on particular implementations. Also, matching memory 84 illustrated in FIG. 1 may be separate from or integral to other memory devices to achieve any suitable arrangement of memory devices for use in trading system 10.

It should be understood that the internal structure of trading platform 50 and the interfaces, modules, processors, and memory devices associated therewith is malleable and can be readily changed, modified, rearranged, or reconfigured to achieve the intended operations of trading platform 50.

Figures 2, 3:
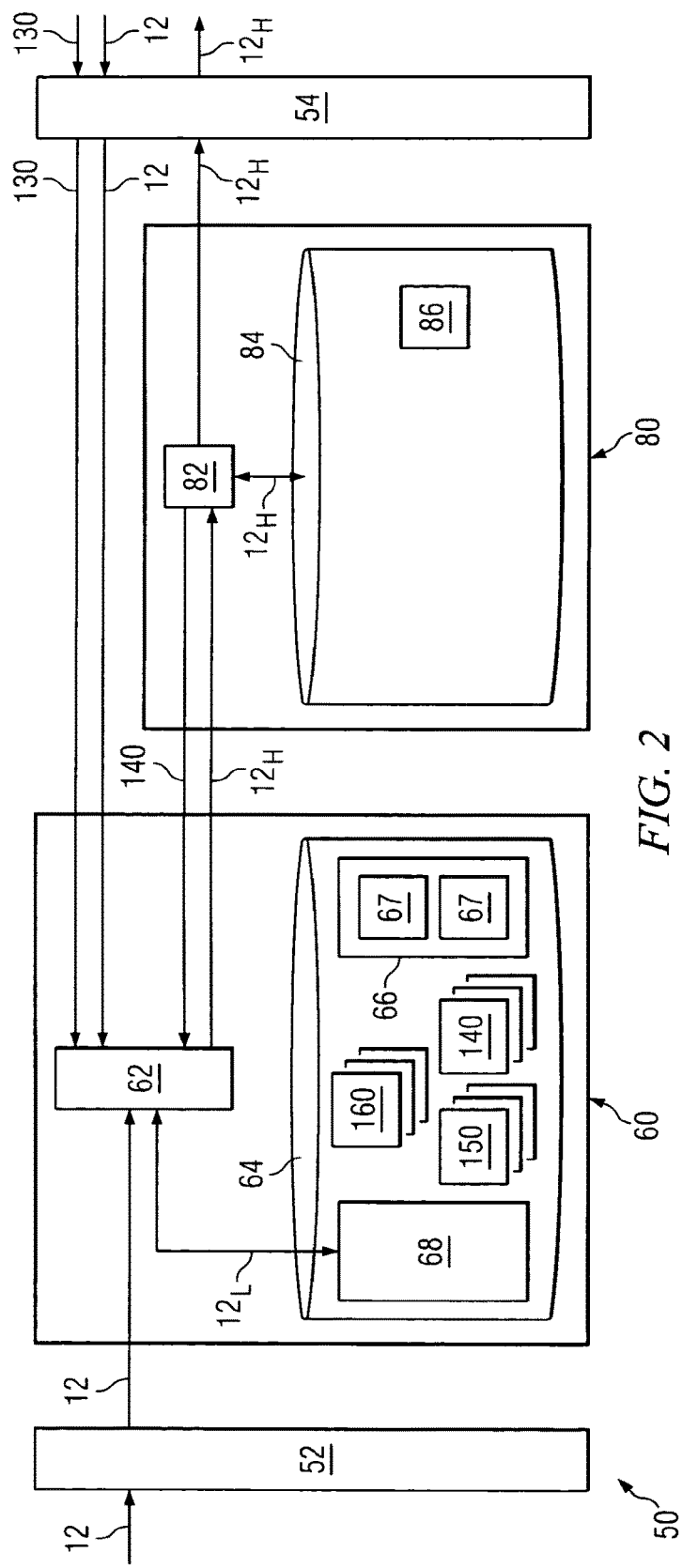
FIG. 2 illustrates a flow of operation among components of a trading platform according to one embodiment of the present invention.
FIG. 3 illustrates example quality scores associated with trading orders according to one embodiment of the present invention.

FIG. 2 illustrates a flow of operation among certain components of trading platform 50 according to certain embodiments of the present invention. Optimizer module 60 receives a plurality of trading orders 12 from client interface 52. Each trading order 12 received by optimizer module 60 is associated with certain objective characteristics. In particular, each trading order 12 is for a particular quantity of a particular trading product. In addition, some of the trading orders 12 may be associated with a particular price.

In addition to receiving trading orders 12, optimizer module 60 may receive market data 130. Market data 130 represents current conditions in market centers 40. These conditions may comprise current trading volumes, best bid/offer prices, trends in prices, trends in trading volumes, number of outstanding trading orders 12, number of active traders 70, time of entry of trading orders 12, and/or any other suitable number and combination of market conditions.

In addition to receiving trading orders 12 and market data 130, optimizer module 60 may receive platform data 140. Platform data 140 represents current conditions in trading platform 50. These conditions may comprise current computing capacity of trading platform 50, current storage capacity of trading platform 50, time required to process trading orders 12, electronic transmission speeds, connection speeds, amount of network traffic, number of outstanding trading orders 12, and/or any other suitable number and combination of system characteristics.

Using one or more rules 67 stored in optimizer memory 64, optimizer processor 62 is operable to process market data 130, platform data 140, and the objective characteristics associated with trading orders 12 to determine which trading orders 12 are most likely to result in timely executed transactions. Optimizer processor 62 is thereby operable to determine which trading orders 12 are most likely to increase liquidity in the marketplace and which trading orders 12 are most likely to result in efficient use of system resources. Based on these determinations, optimizer module

60 may prioritize, sequence, and/or filter trading orders 12. In particular, optimizer module 60 may assign priority to a trading order 12 that is likely to result in a timely executed trade. If optimizer module 60 determines that a particular trading order 12 is unlikely to result in a timely executed trade, optimizer module 60 may filter or not submit that trading order 12 to matching module 80 and/or market centers 40. Alternatively, optimizer module 60 may submit that trading order 12 to matching module 80 and/or market centers 40 after submitting those trading orders 12 that are more likely to result in timely executed trades.

According to certain embodiments, optimizer module 60 may prioritize and/or filter trading orders 12 by assigning quality scores 150 to trading orders 12. Using one or more rules 67 stored in optimizer memory 64, optimizer module 60 may calculate a quality score 150 for each trading order 12 based at least in part on market data 130, platform data 140, and/or the objective characteristics associated with trading orders 12. According to certain embodiments, the quality score 150 of a particular trading order 12 may represent the likelihood that the particular trading order 12 will result in a timely executed trade. For example, a particular rule 67 in optimizer memory 64 may direct optimizer module 60 to assign quality scores 150 on a ten point scale based on price and size. In this example, optimizer module 60 may allocate six points to a particular bid if the bid price is equal to the best bid price in market data 130, five points if the bid price is one incremental unit less than the best bid price, four points if the bid price is two incremental units less than the best bid price, and so forth. In this example, the particular rule 67 may also direct optimizer module 60 to allocate to the particular bid an additional four points if the bid is for more than 100 million units, three points if the bid is for between 100 million units and 50 million units, two points if the bid is for between 50 million and 25 million units, and one point is the bid is for between 25 million and 10 million units. Thus, in this example, a bid equal to the best bid price and for more than 100 million units will receive a quality score 150 of ten, but a bid that is two increments less than the best bid price and for 30 million units will receive a quality score 150 of six. As illustrated in this example, by using one or more rules 67 stored in optimizer memory 64, optimizer module 60 may assign a quality score 150 to a trading order 12 based at least in part on the objective characteristics of the trading order 12, on market data 130, on platform data 140, and/or on the objective characteristics of other trading orders 12.

In the foregoing example, quality score 150 was determined according to a ten point scale based on price and size of trading order 12. It will be understood, however, that quality score 150 may be determined according to any suitable scale based on any suitable number and combination of characteristics associated with market centers 40, trading platform 50, trading orders 12, and/or any other component of trading system 10.

Because trading platform 50 may continuously receive trading orders 12 from traders 70, optimizer module 60 may group trading orders 12 into batches based on a time interval. Optimizer module 60 may then prioritize the trading orders 12 in a particular batch relative to each other. For example, trading platform 50 may receive eight trading orders 12 between 12:31:28 p.m. and 12:31:29 p.m. and thirteen trading orders 12 between 12:31:29 p.m. and 12:31:30 p.m. In this example, if each batch is based on a one second interval, then optimizer module 60 may group the eight trading orders 12 into one batch and the thirteen trading orders 12 into another batch. In this example, optimizer module 60 may prioritize, sequence, and/or filter the eight trading orders 12 of the first batch relative to each other according to market data 130 and platform data 140 that is current as of 12:31:29 p.m. Similarly, optimizer module 60 may prioritize, sequence, and/or filter the thirteen trading orders 12 of the second batch relative to each other according to market data 130 and platform data 140 that is current as of 12:31:30 p.m. Although this example illustrates a batch interval of one second, it should be understood that the batch interval may be any suitable fixed or variable period of time such as, for example, a microsecond or a millisecond.

Using one or more rules 67 in optimizer memory 64, optimizer module 60 may determine a quality threshold 160 based at least in part on the objective characteristics of trading orders 12, market data 130, and/or platform data 140. According to certain embodiments, the quality threshold 160 is a quality level used for determining which trading orders 12 should be submitted to matching module 80 and/or market centers 40 for execution. In some embodiments, optimizer module 60 may submit to matching module 80 and/or market centers 40 those trading orders 12 with quality scores 150 that are above the quality threshold 160. Trading orders 12 with quality scores 150 that are above the quality threshold 160 may be referred to as high quality trading orders $12_H$. The trading orders 12 with quality scores 150 that are lower than the quality threshold 160 may be referred to as low quality trading orders $12_L$. Low quality trading orders $12_L$ may be stored in a queue 68 in optimizer memory 64, may be deleted, or may be returned to the corresponding trader 70. According to certain embodiments, optimizer module 60 may periodically recalculate the quality threshold 160 based at least in part on current market data 130, platform data 140, and/or the characteristics of trading orders 12. For example, in some embodiments, the period for recalculating the quality threshold 160 may correspond to the batch interval.

Referring to FIG. 3, an example illustrates certain embodiments of the present invention. Trading platform 50 receives trading order 12*a* at 12:31:28 p.m. One second later, trading platform 50 receives trading order 12*b*. Trading order 12*a* is a bid for 11 million units of product X with a bid price of $11.00 per unit. Trading order 12*b* is a bid for 125 million units of product X with a bid price of $12.00 per unit. In the present example, optimizer module 60 groups trading orders 12*a* and 12*b* into the same batch. According to current market data 130, the best bid price for product X is $13.00 per unit. Optimizer memory 64 comprises a particular rule 67 to assign a quality score 150 to each trading order 12. In this example, the particular rule 67 dictates that optimizer module 60 allocate six points to trading order 12 if the bid price is equal to the best bid price in market data 130, five points if the bid price of trading order 12 is one incremental unit less than the best bid price, four points if the bid price of trading order 12 is two incremental units less than the best bid price, and so forth. The particular rule 67 in optimizer memory 64 also dictates that optimizer module 60 allocate four points if the bid is for more than 100 million units, three points if the bid is for between 100 million units and 50 million units, two points if the bid is for between 50 million and 25 million units, and one point is the bid is for between 25 million and 10 million units.

In the present example, based on the particular rule 67, optimizer module 60 assigns to trading order 12*a* a quality score 150 of five points (four points because $11.00 is two incremental units less than the best bid price of $13.00 plus one point because the bid is for between 25 million and 10 million units). Optimizer module 60 assigns to trading order 12*b* a quality score 150 of nine points (five points because $12.00 is one incremental unit less than the best bid price of $13.00 plus four points because the bid is for more than 100 million units). In the present example, optimizer memory 64 comprises a second rule 67 for calculating a quality threshold 160 based on the objective characteristics of trading orders 12, current market data 130, and current platform data 140. Based on the second rule 67 and the relevant data, optimizer module 60 calculates a quality threshold 160 of six points. In the present example, because trading order 12*a* has a quality score 150 of five points, optimizer module 60 places trading order 12*a* in queue 68 in optimizer memory 64. Because trading order 12*b* has a quality score 150 of nine points, optimizer module 60 submits trading order 12*b* to matching module 80 for execution. Thus, in the present example, even though trading order 12*b* was received after trading order 12*a*, optimizer module 60 first submits trading order 12*b* to matching module 80 because trading order 12*b* is deemed to be of higher quality based at least in part on current market conditions. Although the particular rule 67 illustrated in this example was based on the price and size of a trading order 12, it should be understood that there may be any number of rules 67 in optimizer memory 64 and each rule 67 may be based on any number and combination of market and/or system factors and may use any appropriate unit or point system for quantifying and/or calculating quality scores 150.

The foregoing example illustrates how the present invention may, according to certain embodiments, increase liquidity in a market. By submitting higher quality trading orders 12 ahead of or instead of lower quality trading orders 12, optimizer module 60 increases the likelihood that more trading orders 12 submitted to matching module 80 and/or market centers 40 will result in timely executed trades. By increasing trades, optimizer module 60 may increase liquidity in the marketplace.

According to certain embodiments, a trading order 12 associated with a quality score 150 that is below the quality threshold 160 may be stored in queue 68 in optimizer memory 64. In some embodiments, optimizer module 60 may periodically recalculate the quality score 150 of a trading order 12 in queue 68. Alternatively, or in addition, optimizer module 60 may periodically recalculate the quality threshold 160. If the recalculated quality score 150 of a trading order 12 in queue 68 is above the original and/or recalculated quality threshold 160, optimizer module 60 may submit the trading order 12 from queue 68 in optimizer memory 64 to matching module 80 and/or market centers 40 for execution.

According to certain embodiments, matching module 80 receives trading orders 12 from optimizer module 60. Matching module 80 may process trading orders 12 based on the sequence in which those trading orders 12 are received from optimizer module 60. For example, matching module 80 may first process the trading order 12 that is first received from optimizer module 60, then process the trading order 12 that is next received from optimizer module 60, and so forth. According to other embodiments, matching module 80 may process trading orders 12 from optimizer module 60 based on the sequence in which those trading orders 12 were submitted to trading system 10 by traders 70.

In the foregoing example, optimizer module 60 used quality threshold 160 to determine which trading orders 12 to submit to matching module 80 and/or market centers 40. According to certain embodiments, optimizer module 60 may not use quality threshold 160. In some embodiments, optimizer module 60 may first prioritize trading orders 12 according to their respective quality scores 150 and then submit to matching module 80 and/or market centers 40 all trading orders 12 in order of decreasing quality scores 150.

Figure 4:
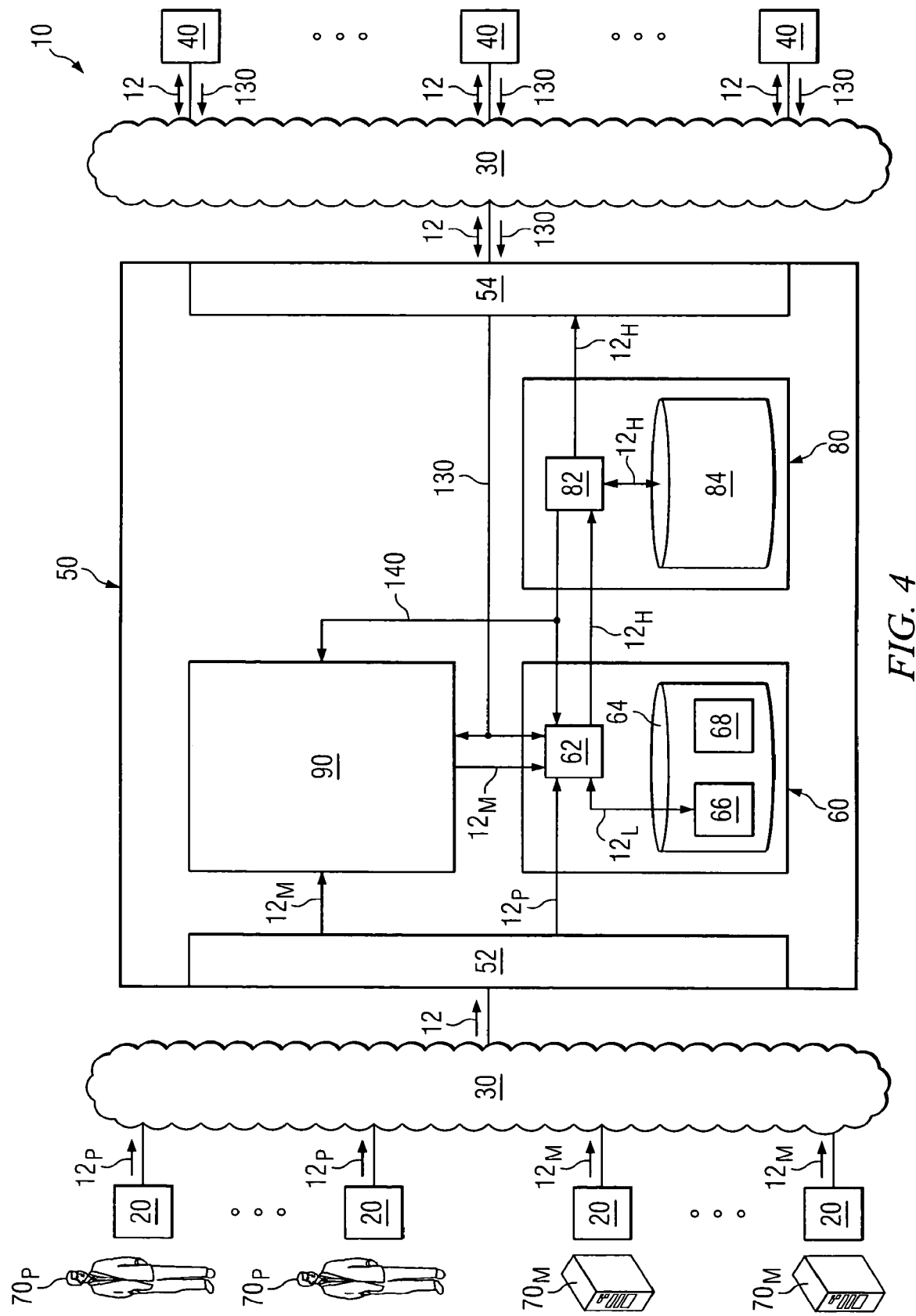
FIG. 4 illustrates a trading system comprising a balancing module according to one embodiment of the present invention.

Referring to FIG. 4, traders 70 may comprise humans and machines. Trading orders 12 submitted by machine traders $70_M$ may be referred to as machine trading orders $12_M$. Trading orders 12 submitted by human traders $70_P$ may be referred to as human trading orders $12_P$. Machine traders $70_M$ may refer to a robot, an automated computer system, a machine, and/or any other device configured for automatically submitting trading orders 12 to trading system 10 in response to configurable criteria, factors, and/or thresholds. According to certain embodiments, trading platform 50 may increase liquidity in the marketplace by differentiating between trading orders 12 submitted by human traders $70_P$ and trading orders 12 submitted by machine traders $70_M$. To achieve such differentiation, trading platform 50 may comprise a balancing module 90. FIG. 4 illustrates a flow of operation involving balancing module 90, according to certain embodiments of the present invention.

Client interface 52 may be operable to determine which trading orders 12 were submitted by human traders $70_P$ and which trading orders 12 were placed by machine traders $70_M$. Client interface 52 may transmit the trading orders $12_P$ submitted by human traders $70_P$ directly to optimizer processor 62. Client interface 52 may transmit the trading orders $12_M$ submitted by machine traders $70_M$ to balancing module 90.

Balancing module 90 represents any hardware, software, firmware, or combination thereof operable to process, control, and monitor the prioritizing, filtering, and/or sequencing of trading orders $12_M$ submitted by machine traders $70_M$. Balancing module 90 may comprise a general-purpose personal computer (PC), a workstation, a Unix-based computer, a server computer, or any other suitable processing device. Balancing module 90 may be communicatively coupled to client interface 52, market interface 54, and/or optimizer module 60. Balancing module 90 may comprise a processor and memory usable to prioritize, sequence, and/or filter trading orders $12_M$ submitted by machine traders $70_M$. In addition, balancing module 90 may comprise algorithms, functions, tables, or formulas for optimizing the submission of trading orders $12_M$ from machine traders $70_M$ to optimizing module 60. Generally, balancing module 90 receives trading orders $12_M$ from machine traders $70_M$ and prioritizes, filters, and/or sequences trading orders $12_M$ based at least in part on market data 130 received from market centers 40, on platform data 140, and/or on the characteristics of trading orders 12. According to certain embodiments, optimizer module 60 may determine a particular number of trading orders $12_M$ to request from balancing module 90 based on market data 130, platform data 140, and/or the characteristics of trading orders 12.

An example illustrates certain embodiments of the present invention. Client interface 52 receives sixteen trading orders 12—six from human traders $70_P$ and ten from machine traders $70_M$. Client interface 52 transmits the six trading orders $12_P$ from human traders $70_P$ directly to optimizer module 60. Client interface 52 transmits the ten trading orders $12_M$ from machine traders $70_M$ to balancing module 90. In the present example, optimizer module 60 comprises a rule 67 to request from balancing module 90 one trading order $12_M$ submitted by a machine trader $70_M$ for every two trading orders $12_P$ submitted by human traders $70_P$. Since optimizer module 60 received six trading orders $12_P$ submitted by human traders $70_P$, then optimizer module 60 may request from balancing module 90 three trading orders $12_M$ submitted by machine traders $70_M$. Balancing module 90 receives the request from optimizer module 70. Using one or more optimization algorithms stored in balancing module 90, balancing module 90 determines the three preferred trading orders $12_M$ submitted by machine traders $70_M$. (The determination of which trading orders 12 are "preferred" may be based on any suitable criteria, method, settings, limits, data, formulas, and/or any suitable number and combination of factors.) Balancing module 90 then transmits the three preferred trading orders $12_M$ submitted by machine traders $70_M$ to optimizer module 60. Upon receiving the requested trading orders $12_M$ from balancing module 90, optimizer module 60 prioritizes, sequences, and/or filters the nine trading orders 12 (six from human traders $70_P$ and three from machine traders $70_M$) based at least in part on market data 130 received from market centers 40, on platform data 140, and/or on the characteristics of trading orders 12. Optimizer module 60 then submits one or more trading orders 12 to matching module 80. Although in the foregoing example the requested number of trading orders $12_M$ from machine traders $70_M$ was based on the number of trading orders $12_P$ from human traders $70_P$, it should be understood that optimizer module 60 may use any suitable factors, formulas, or algorithms for determining the number of trading orders $12_M$ to request from balancing module 90. In addition, or alternatively, optimizer module 60 may modify quality score 150 associated with trading order 12 based at least in part on whether that trading order 12 was submitted by a human trader $70_P$ or a machine trader $70_M$.

Figure 5:
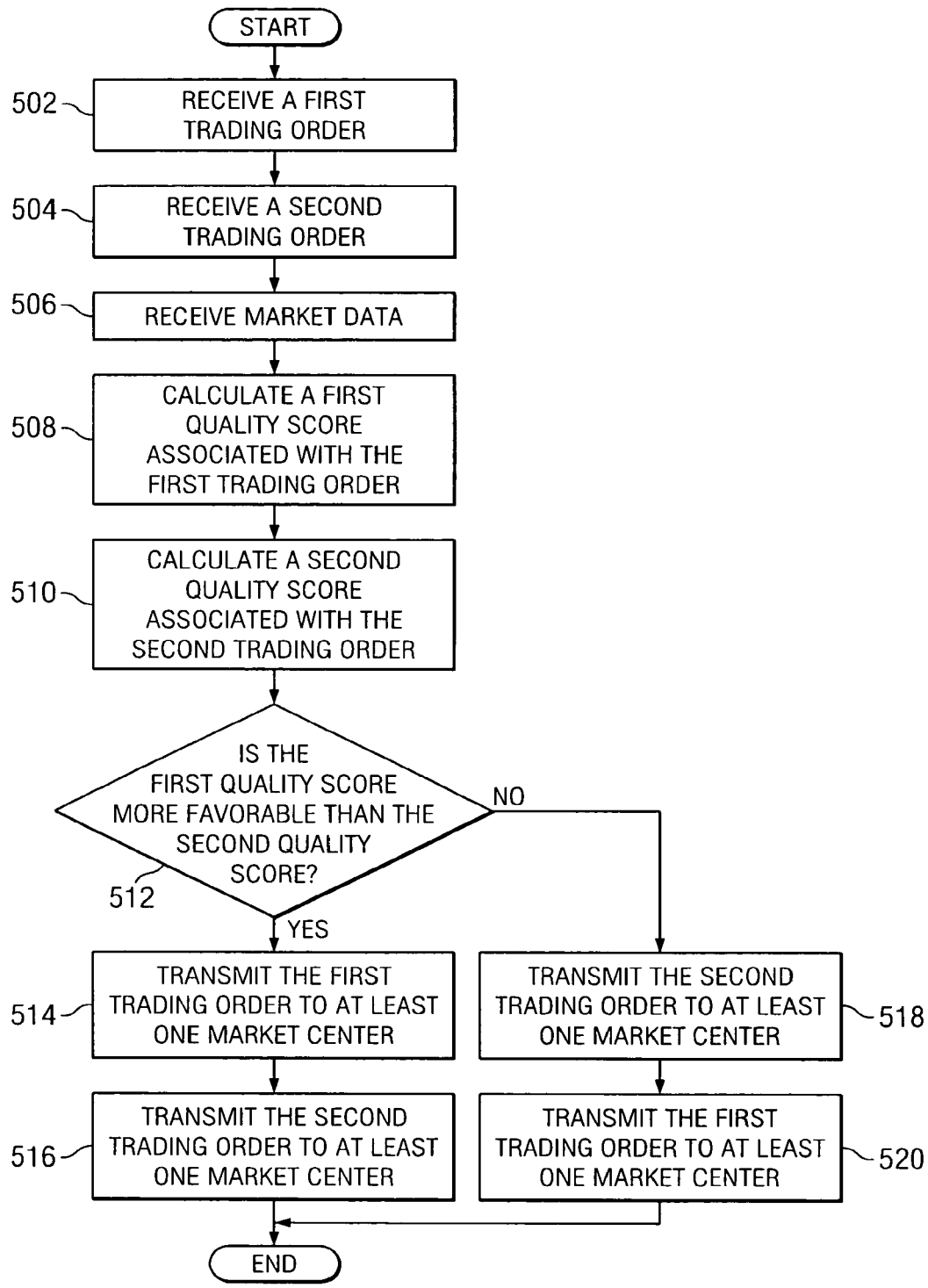
FIG. 5 illustrates a flowchart for processing trading orders according to one embodiment of the present invention.

FIG. 5 illustrates a flowchart for processing trading orders 12 according to certain embodiments of the present invention. The method begins at step 502 where trading platform 50 receives a first trading order 12. The first trading order 12 may be associated with a particular price and a particular trading product. At step 504, trading platform 50 receives a second trading order 12. In some embodiments, the second trading order 12 may be associated with a particular price and may be for the same trading product as the first trading order 12. At step 506, trading platform 50 receives market data 130 from at least one market center 40.

At step 508, trading platform 50 calculates a first quality score 150 associated with the first trading order 12. At step 510, trading platform 50 calculates a second quality score 150 associated with the second trading order 12. The first and second quality scores 150 may be based at least in part on the first trading order 12, the second trading order 12, market data 130, and/or platform data 140. At step 512, trading platform 50 may determine whether the first quality score 150 associated with the first trading order 12 is more favorable than the second quality score 150 associated with the second trading order 12. A more favorable quality score 150 may indicate that the associated trading order 12 would be executed faster than another trading order 12 associated with a less favorable quality score 150. If at step 512, trading platform 50 determines that the first quality score 150 associated with the first trading order 12 is more favorable than the second quality score 150 associated with the second trading order 12, then at step 514 trading platform 50 may transmit the first trading order 12 to at least one market center 40 for execution. Then at step 516, trading platform 50 may transmit the second trading order 12 to at least one market center 40 for execution. However, if at step 512, trading platform 50 determines that the first quality score 150 associated with the first trading order 12 is less favorable than the second quality score 150 associated with the second trading order 12, then at step 518 trading platform 50 may transmit the second trading order 12 to at least one market center 40 for execution. Then at step 520, trading platform 50 may transmit the first trading order 12 to at least one market center 40 for execution.

In the foregoing example, trading platform 50 compares the first and second quality scores 150 against one another. In some embodiments, trading platform 50 may compare quality scores 150 associated with trading orders 12 against a quality threshold 160. Trading platform 50 may generate quality threshold 160 based at least in part on market data 130, platform data 140, and/or trading orders 12. If a particular trading order 12 is associated with a particular quality score 150 that satisfies quality threshold 160, then trading platform 50 may transmit that trading order 12 to one or more market centers 40 for execution. However, if a particular trading order 12 is associated with a particular quality score 150 that does not satisfy quality threshold 160, then trading platform 50 may reject that trading order 12, delete that trading order 12, return that trading order 12 to the corresponding trader 70, and/or store that trading order 12 in queue 68 in optimizer memory 64. If trading platform 50 stores that trading order 12 in queue 68, then after a configurable time interval, trading platform 50 may, based at least in part on updated market data 130, calculate an update quality score 150 for that trading order 12. Trading platform 50 may then compare quality threshold 160 against the updated quality score 150 associated with trading order 12 in queue 68. If the updated quality score 150 associated with trading order 12 in queue 68 satisfies quality threshold 160, then trading platform 50 may transmit that trading order 12 to one or more market centers 40 for execution.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for processing trading orders, comprising:
receiving, by at least one processor, a first trading order;
receiving, by the at least one processor, a second trading order;
receiving, by the at least one processor, market data associated with at least one market center; and
determining, by the at least one processor, whether to transmit the second trading order to the at least one market center prior to transmitting the first trading order to the at least one market center, the determination based at least in part on the market data and also based at least in part on platform data representing computing capacity and/or storage capacity associated with a computer trading system;
analyzing, by the at least one processor, quality of trading orders received from traders based on current market data;
analyzing, by the at least one processor, the quality of trading orders based on platform data that includes available processing and storage capacity of the computer trading system;
assigning, by the at least one processor, priority to trading orders that are most likely to result in quickly executed transactions; and
filtering out, by the at least one processor, trading orders that are unlikely to result in timely executed transactions, thereby reducing processing time for realistic trading orders and increasing liquidity in a market place.

2. The method of claim 1, wherein the determination comprises:
calculating, by the at least one processor, a first quality score associated with the first trading order, the first quality score based at least in part on the market data and on the first trading order;
calculating, by the at least one processor, a second quality score associated with the second trading order, the second quality score based at least in part on the market data and on the second trading order; and
comparing, by the at least one processor, the first quality score associated with the first trading order against the second quality score associated with the second trading order.

3. The method of claim 2, wherein: the first trading order is associated with a first price; the market data comprises a second price; and the first quality score is based at least in part on the first price and the second price.

4. The method of claim 2, wherein: the first trading order is associated with a quantity of a trading product; and the first quality score is based at least in part on the quantity of the trading product.

5. The method of claim 2, wherein the first quality score is based at least in part on whether the first trading order is associated with a machine trader.

6. The method of claim 2, further comprising:
transmitting, by the at least one processor, at least one trading order to a queue;
receiving updated market data after a configurable interval of time;
calculating, by the at least one processor, an updated quality score associated with the at least one trading order in the queue, the updated quality score based at least in part on the updated market data and the at least one trading order; and
determining, by the at least one processor, whether to transmit the at least one trading order to the at least one market center, the determination based at least in part on the updated quality score.

7. The method of claim 1, wherein the determination comprises:
calculating, by the at least one processor, a first quality score associated with the first trading order, the first quality score based at least in part on the market data and on the first trading order;
calculating, by the at least one processor, a second quality score associated with the second trading order, the second quality score based at least in part on the market data and on the second trading order;
determining, by the at least one processor, a quality threshold based at least in part on the market data; and
comparing, by the at least one processor, the first quality score associated with the first trading order and the second quality score associated with the second trading order against the quality threshold.

8. The method of claim 7, wherein: the first trading order is associated with a first price; the market data comprises a second price; and the first quality score is based at least in part on the first price and the second price.

9. The method of claim 7, wherein: the first trading order is associated with a quantity of a trading product; and the first quality score is based at least in part on the quantity of the trading product.

10. The method of claim 7, wherein the first quality score is based at least in part on whether the first trading order is associated with a machine trader.

11. The method of claim 7, further comprising rejecting or deleting the first or second trading order if the particular trading order is associated with a quality score that does not satisfy the quality threshold.

12. The method of claim 7, further comprising transmitting the first or second trading order to a queue if the particular trading order is associated with a quality score that does not satisfy the quality threshold.

13. The method of claim 12, further comprising:
receiving, by the at least one processor, updated market data after a configurable interval of time;
calculating, by the at least one processor, an updated quality score associated with the first or second trading order in the queue, the updated quality score based at least in part on the updated market data and the first or second trading order;
comparing, by the at least one processor, the updated quality score associated with the first or second trading order against the quality threshold; and
if the updated quality score associated with the first or second trading order satisfies the quality threshold, transmitting, by the at least one processor, the first or second trading order to the at least one market center.

14. A system for processing trading orders, comprising:
at least one computing device of an optimizer module; and
at least one memory device for having instructions stored thereon that when executed by the at least one computing device direct the at least one computing device to:
receive a first trading order;
receive a second trading order;
receive market data associated with at least one market center; and
determine whether to transmit the second trading order to the at least one market center prior to transmitting the first trading order to the at least one market center, the determination based at least in part on the market data and also based at least in part on platform data representing computing capacity and/or storage capacity associated with a computer trading system;
analyze quality of trading orders received from traders based on current market data;
analyze quality of trading orders based on platform data that includes available processing and storage capacity of the computer trading system;
assign priority to trading orders that are most likely to result in quickly executed transactions; and
filter out trading orders that are unlikely to result in timely executed transactions, thereby reduce processing time for realistic trading orders and increase liquidity in a market place.

15. The system of claim 14, wherein the optimizer module is operable to make the determination by:
calculating a first quality score associated with the first trading order, the first quality score based at least in part on the market data and on the first trading order;
calculating a second quality score associated with the second trading order, the second quality score based at least in part on the market data and on the second trading order; and
comparing the first quality score associated with the first trading order against the second quality score associated with the second trading order.

16. The system of claim 15, wherein: the first trading order is associated with a first price; the market data comprises a second price; and the first quality score is based at least in part on the first price and the second price.

17. The system of claim 15, wherein: the first trading order is associated with a quantity of a trading product; and the first quality score is based at least in part on the quantity of the trading product.

18. The system of claim 15, wherein the first quality score is based at least in part on whether the first trading order is associated with a machine trader.

19. The system of claim 15, wherein the optimizer module is further operable to:
transmit at least one trading order to a queue;
receive updated market data after a configurable interval of time;
calculate an updated quality score associated with the at least one trading order in the queue, the updated quality score based at least in part on the updated market data and the at least one trading order; and
determine whether to transmit the at least one trading order to the at least one market center, the determination based at least in part on the updated quality score.

20. The system of claim 14, wherein the optimizer module is operable to make the determination by:
calculating a first quality score associated with the first trading order, the first quality score based at least in part on the market data and on the first trading order;
calculating a second quality score associated with the second trading order, the second quality score based at least in part on the market data and on the second trading order;
determining a quality threshold based at least in part on the market data; and
comparing the first quality score associated with the first trading order and the second quality score associated with the second trading order against the quality threshold.

21. The system of claim 20, wherein: the first trading order is associated with a first price; the market data comprises a second price; and the first quality score is based at least in part on the first price and the second price.

22. The system of claim 20, wherein: the first trading order is associated with a quantity of a trading product; and the first quality score is based at least in part on the quantity of the trading product.

23. The system of claim 20, wherein the first quality score is based at least in part on whether the first trading order is associated with a machine trader.

24. The system of claim 20, wherein the optimizer module is further operable to reject or delete the first or second trading order if the particular trading order is associated with a quality score that does not satisfy the quality threshold.

25. The system of claim 20, wherein the optimizer module is further operable to transmit the first or second trading order to a queue if the particular trading order is associated with a quality score that does not satisfy the quality threshold.

26. The system of claim 25, wherein the optimizer module is further operable to:
receive updated market data after a configurable interval of time;
calculate an updated quality score associated with the first or second trading order in the queue, the updated quality score based at least in part on the updated market data and the first or second trading order;
compare the updated quality score associated with the first or second trading order against the quality threshold; and
if the updated quality score associated with the first or second trading order satisfies the quality threshold, transmit the first or second trading order to the at least one market center.

27. A non-transitory machine-readable medium for having instructions stored thereon and, when executed by the at least one processor, cause the at least one processor to:
receive a first trading order; receive a second trading order; receive market data associated with at least one market center;
determine whether to transmit the second trading order to the at least one market center prior to transmitting the first trading order to the at least one market center, the determination based at least in part on the market data and also based at least in part on platform data representing computing capacity and/or storage capacity associated with a computer trading system;
analyze quality of trading orders received from traders based on current market data;
analyze quality of trading orders based on platform data that includes available processing and storage capacity of the computer trading system;
assign priority to trading orders that are most likely to result in quickly executed transactions; and
filter out trading orders that are unlikely to result in timely executed transactions, thereby reduce processing time for realistic trading orders and increase liquidity in a market place.

28. The non-transitory machine-readable medium of claim 27 for having instructions stored thereon and, when executed by the at least one processor, cause the at least one processor to make the determination by:
calculating a first quality score associated with the first trading order, the first quality score based at least in part on the market data and on the first trading order;
calculating a second quality score associated with the second trading order, the second quality score based at least in part on the market data and on the second trading order; and
comparing the first quality score associated with the first trading order against the second quality score associated with the second trading order.

29. The non-transitory machine-readable medium of claim 28 for having instructions stored thereon, wherein: the first trading order is associated with a first price; the market data comprises a second price; and the first quality score is based at least in part on the first price and the second price.

30. The non-transitory machine-readable medium of claim 28 for having instructions stored thereon, wherein: the first trading order is associated with a quantity of a trading product; and the first quality score is based at least in part on the quantity of the trading product.

31. The non-transitory machine-readable medium of claim 28 for having instructions stored thereon, wherein the first quality score is based at least in part on whether the first trading order is associated with a machine trader.

32. The non-transitory machine-readable medium of claim 27 for having instructions stored thereon and, when executed by the at least one processor, cause the at least one processor to:
transmit at least one trading order to a queue; receive updated market data after a configurable interval of time;

calculate an updated quality score associated with the at least one trading order in the queue, the updated quality score based at least in part on the updated market data and the at least one trading order; and determine whether to transmit the at least one trading order to the at least one market center, the determination based at least in part on the updated quality score.

33. The non-transitory machine-readable medium of claim 27 for having instructions stored thereon and, when executed by the at least one processor, cause at least one processor to make the determination by:

calculating a first quality score associated with the first trading order, the first quality score based at least in part on the market data and on the first trading order;

calculating a second quality score associated with the second trading order, the second quality score based at least in part on the market data and on the second trading order;

determining a quality threshold based at least in part on the market data; and comparing the first quality score associated with the first trading order and the second quality score associated with the second trading order against the quality threshold.

34. The non-transitory machine-readable medium of claim 33 for having instructions stored thereon, wherein: the first trading order is associated with a first price; the market data comprises a second price; and the first quality score is based at least in part on the first price and the second price.

35. The non-transitory machine-readable medium of claim 33 for having instructions stored thereon, wherein: the first trading order is associated with a quantity of a trading product; and the first quality score is based at least in part on the quantity of the trading product.

36. The non-transitory machine-readable medium of claim 33 for having instructions stored thereon, wherein the first quality score is based at least in part on whether the first trading order is associated with a machine trader.

37. The non-transitory machine-readable medium of claim 27 for having instructions stored thereon and when executed by the at least one processor, cause the at least one processor to reject or delete the first or second trading order if the particular trading order is associated with a quality score that does not satisfy the quality threshold.

38. The non-transitory machine-readable medium of claim 27 for having instructions stored thereon and, when executed by the at least one processor, cause the at least one processor to transmit the first or second trading order to a queue if the first or second trading order is associated with a quality score that does not satisfy the quality threshold.

39. The non-transitory machine-readable medium of claim 27 for having instructions stored thereon and, when executed by the at least one processor, cause at least one processor to:

receive updated market data after a configurable interval of time;

calculate an updated quality score associated with the first or second trading order in the queue, the updated quality score based at least in part on the updated market data and the first or second trading order;

compare the updated quality score associated with the first or second trading order against the quality threshold; and if the updated quality score associated with the first or second trading order satisfies the quality threshold, transmit the at least one trading order to the at least one market center.

* * * * *